(12) United States Patent
Anderson et al.

(10) Patent No.: US 11,827,555 B2
(45) Date of Patent: Nov. 28, 2023

(54) OPTICAL FIBER FORMING APPARATUS

(71) Applicant: CORNING INCORPORATED, Corning, NY (US)

(72) Inventors: Erling Richard Anderson, Wilmington, NC (US); Tammy Michelle Hoffmann, Wilmington, NC (US); Nikolaos Pantelis Kladias, Horseheads, NY (US); Robert Clark Moore, Wilmington, NC (US); Christopher Scott Thomas, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 191 days.

(21) Appl. No.: 17/319,811

(22) Filed: May 13, 2021

(65) Prior Publication Data

US 2021/0355018 A1 Nov. 18, 2021

Related U.S. Application Data

(60) Provisional application No. 63/025,522, filed on May 15, 2020.

(51) Int. Cl.
*C03B 37/029* (2006.01)

(52) U.S. Cl.
CPC ........ *C03B 37/029* (2013.01); *C03B 2205/62* (2013.01)

(58) Field of Classification Search
None
See application file for complete search history.

(56) References Cited

U.S. PATENT DOCUMENTS

| 4,437,870 A | 3/1984 | Miller |
| 5,637,130 A | 6/1997 | Nagayama et al. |

(Continued)

FOREIGN PATENT DOCUMENTS

| CN | 108975677 A | * | 12/2018 | ........... C03B 37/029 |
| JP | 05030126 U | * | 4/1993 | |

(Continued)

OTHER PUBLICATIONS

JP-05030126-U Machine Translation Performed Jan. 14, 2023. (Year: 2023).*

(Continued)

*Primary Examiner* — Lisa L Herring
(74) *Attorney, Agent, or Firm* — Yiqun Zhao

(57) ABSTRACT

An optical fiber forming apparatus comprises: a draw furnace comprising: (i) a muffle with an inner surface, (ii) an axial opening below the muffle, the inner surface of the muffle defining a passageway extending through the axial opening, and (iii) an upper inlet into the passageway; and a tube that extends into the passageway of the draw furnace above the axial opening, the tube having (i) an outer surface and the inner surface of the muffle surrounds the outer surface of the tube with a space separating the outer surface of the tube from the inner surface of the muffle, (ii) an inner surface that defines a second passageway extending through the tube, (iii) an inlet into the second passageway of the tube, (iii) an outlet out of the second passageway of the tube.

22 Claims, 26 Drawing Sheets

(56) References Cited

U.S. PATENT DOCUMENTS

| | | | |
|---|---|---|---|
| 9,475,722 B2 | 10/2016 | Enomoto et al. | |
| 11,198,636 B2 | 12/2021 | Anderson et al. | |
| 2003/0205068 A1 | 11/2003 | Taru et al. | |
| 2009/0145169 A1 | 6/2009 | Bae et al. | |
| 2014/0226948 A1* | 8/2014 | Enomoto | G02B 6/10 65/435 |
| 2020/0189958 A1* | 6/2020 | Kawaguchi | C03B 37/027 |

FOREIGN PATENT DOCUMENTS

| | | | | |
|---|---|---|---|---|
| JP | 09002832 A | * | 1/1997 | C03B 37/029 |
| JP | 10-153715 A | | 6/1998 | |
| JP | 2003335545 A | * | 11/2003 | C03B 37/02727 |
| JP | 2013203621 A | * | 10/2013 | C03B 37/029 |
| WO | WO-2018040575 A1 | * | 3/2018 | C03B 37/029 |

OTHER PUBLICATIONS

JP-2003335545-A Machine Translation Performed Jan. 14, 2023. (Year: 2023).*

JP2013203621-A Machine Translation Performed Jan. 14, 2023. (Year: 2023).*

CN-108975677-A Machine Translation Performed Jan. 14, 2023. (Year: 202).*

WO-2018040575-A1 Machine Translation Preformed Jan. 14, 2023. (Year: 2023).*

JP-09002832-A Machine Translation Clarivate Analytics— Performed Apr. 10, 2023. (Year: 2023).*

B. Karlekar and R. Desmond, "Engineering Heat Transfer", 1977, 1 page.

Devereux, B.M, et al., "Frequency Response Analysis of Polymer Melt Spinning," Ind. Eng. Chem.Res. vol. 33, 1994, pp. 2384-2390.

M. Forest et al., "Unsteady analyses of thermal glass fibre drawing processes," Euro J. Appl. Math, vol. 12, Issue 4, 2001, pp. 479-496.

S. Kase, et al., "Studies on Melt Spinning. VIII. Transfer Function Approach", Journal of Applied Polymer Science, vol. 27, 1982, pp. 4439-4465.

Young, D.G, et al., "Disturbance Propagation in Melt Spinning," Chem. Eng. Sci, vol. 44 Issue 9, 1989, pp. 1807-1818.

International Search Report and Written Opinion of the International Searching Authority; PCT/US2021/031893; dated Sep. 1, 2021; 10 pages; European Patent Office.

* cited by examiner

Comparative Example 1A

OPTICAL FIBER FORMING APPARATUS

CROSS-REFERENCE TO RELATED APPLICATIONS

This application claims the benefit of priority under 35 U.S.C. § 119 of U.S. Provisional Application Ser. No. 63/025,522 filed on May 15, 2020, the content of which is relied upon and incorporated herein by reference in its entirety.

TECHNICAL FIELD

This disclosure relates to the technical field of optical fibers.

BACKGROUND

A draw furnace can be utilized to draw optical fiber from a preform. The draw furnace includes a passage in which the preform and initially drawn optical fiber are disposed. The passage is purged with an inert gas to prevent ambient air from flowing into the passage, which could cause oxidation of components of the draw furnace. The inert gas has heretofore typically been helium. However, helium is increasing in price and not readily renewable. Argon and nitrogen are both possible replacements for helium, because argon and nitrogen cheaper and more abundant than helium.

However, there is a problem in that the use of argon increases the variability of the diameter of the drawn optical fiber relative to helium, resulting in the diameter of the drawn optical fiber being beyond the limits of design specifications.

SUMMARY

The present disclosure addresses that problem in several ways. The present disclosure addresses that problem by reducing a distance between the drawn optical fiber and a boundary for the inert gas within the draw furnace, either via (i) a tube inserted into a muffle of the draw furnace through which the drawn optical fiber travels, with the inert gas flowing both through the tube with the drawn optical fiber and around the tube, (ii) gradually tapering the diameter of the muffle throughout a distance that is larger than the decrease in diameter of the muffle throughout the tapering, or (iii) heating a smaller diameter portion of the muffle through which the drawn optical fiber extends. In either of the first two instances, the flow of the inert gas (such as argon) is rendered sufficiently uniform so as not to significantly affect the variability of the diameter of the drawn optical fiber, allowing the variability to be within the limits of specifications and similar to that described above when helium is utilized. In the third instance, the additional heat suppresses convective instabilities in the smaller diameter portion surrounding the drawn optical fiber, again allowing the variability of the diameter of the drawn optical fiber to be within design specifications. These solutions permit other inert gases such as argon and nitrogen to be utilized instead of helium.

According to a first aspect of the present disclosure, an optical fiber forming apparatus comprises: (a) a draw furnace comprising: (i) a muffle with an inner surface, (ii) an axial opening below the muffle, the inner surface of the muffle defining a passageway extending through the axial opening, and (iii) an upper inlet into the passageway; and (b) a tube that extends into the passageway of the draw furnace above the axial opening, the tube having (i) an outer surface and the inner surface of the muffle surrounds the outer surface of the tube with a space separating the outer surface of the tube from the inner surface of the muffle, (ii) an inner surface that defines a second passageway extending through the tube, (iii) an inlet into the second passageway of the tube, and (iv) an outlet out of the second passageway of the tube.

According to a second aspect, the first aspect, further comprising: a first heating element that heats the passageway of the draw furnace throughout a first range that encompasses at least a portion of the passageway of the draw furnace above the inlet of the tube; and a second heating element that heats the passageway of the draw furnace throughout a second range that encompasses at least a portion of the passageway of the draw furnace above the first range.

According to a third aspect, the second aspect further comprising: a third heating element that heats the passageway of the draw furnace throughout a third range that encompasses a portion of the second passageway of the tube.

According to a fourth aspect, the first aspect, further comprising: an optical fiber preform disposed within the passageway of the draw furnace; optical fiber drawn from the optical fiber preform that extends through the second passageway of the tube; and a first heating element that heats the passageway of the draw furnace throughout a first range that encompasses a tip of the optical fiber preform.

According to a fifth aspect, the fourth aspect further comprising: a second heating element that heats the passageway of the draw furnace throughout a second range that encompasses a portion of the passageway above a main body of the optical fiber preform.

According to an sixth aspect, any one of the fourth through fifth aspects, wherein the optical fiber exits the outlet of the tube at a rate of at least 20 meters per second and has a diameter after exiting the outlet of the tube, the standard deviation ($\sigma$) of which diameter is less than 0.06 μm at frequencies of 0.1 Hz, 1 Hz, and 10 Hz.

According to a seventh aspect, any one of the first through sixth aspects, wherein inert gas flows through the upper inlet and into the passageway of the draw furnace and forms separate streams, one of which flows through the passageway of the draw furnace in the space between the inner surface of the muffle and the outer surface of the tube and out the axial opening of the draw furnace, and the other of which flows into the inlet of the tube, through the second passageway of the tube, and out the outlet of the tube.

According to an eighth aspect, the seventh aspect, wherein the inert gas comprises one or more of argon or nitrogen, and less than 1 percent by volume helium.

According to a ninth aspect, any one of the first through eighth aspects, wherein the inlet of the tube has an inner diameter of 1.27 cm to 2.54 cm.

According to the tenth aspect of the present disclosure, a draw furnace for an optical fiber forming apparatus comprises: a muffle with an inner surface and an axial opening below the muffle, the inner surface of the muffle defining a passageway centered about an axis and extending through the axial opening, the inner surface including: (a) a first straight portion with a radius from the axis that remains at least approximately constant along a length parallel to the axis; (b) a tapered portion disposed between the first straight portion and the axial opening, the tapered portion including a radius from the axis that decreases away from the first straight portion narrowing the passageway, and a vertical length parallel to the axis that is at least two times longer than the largest radius of the tapered portion; and (c) a second straight portion disposed between the tapered portion and the axial opening with a radius from the axis that remains at least approximately constant along a length at least 75 cm, the radius of the second straight portion being 0.635 cm to 1.27 cm.

According to an eleventh aspect, the tenth aspect further comprising: an upper inlet into the passageway disposed closer to the first straight portion than the tapered portion of the inner surface of the muffle; wherein, inert gas flows (i) through the upper inlet and into the passageway, (ii) then along the first straight portion of the inner surface of the muffle, (iii) then along the tapered portion, (iv) then along the second straight portion, and (v) then out the axial opening.

According to a twelfth aspect, the eleventh aspect, wherein the inert gas comprises one or more of argon and nitrogen, and less than 1 percent by volume helium.

According to a thirteenth aspect, any one of the tenth through twelfth aspects further comprising: an optical fiber preform disposed within the passageway; and optical fiber drawn from the optical fiber preform, the optical fiber extends through the passageway and out the axial opening.

According to a fourteenth aspect, the thirteenth aspect further comprising: a first heating element that heats the passageway throughout a first range that encompasses a tip of the optical fiber preform; and a second heating element that heats the passageway throughout a second range that encompasses a portion of the passageway above a main body of the optical fiber preform.

According to the fifteenth aspect, the fourteenth aspect further comprising: a third heating element that heats a third range that encompasses a portion of the passageway that the second straight portion that the inner surface of the muffle defines.

According to the sixteenth aspect, any one of the thirteenth through fifteenth aspects, wherein the optical fiber exits the axial opening at a rate of at least 20 meters per second and has a diameter after exiting the axial opening, the standard deviation of which diameter is less than 0.6 µm at frequencies of 0.1 Hz, 1 Hz, and 10 Hz.

According to the seventeenth aspect of the present disclosure, a draw furnace for an optical fiber forming apparatus comprises: (a) a muffle with an inner surface and an axial opening below the muffle, the inner surface of the muffle defining a passageway centered about an axis and extending through the axial opening, the inner surface including: (i) a first straight portion with a radius from the axis that remains at least approximately constant along a length parallel to the axis; (ii) a narrowing portion disposed between the first straight portion and the axial opening, the narrowing portion including a radius from the axis that decreases away from the first straight portion narrowing the passageway; and (iii) a second straight portion disposed between the narrowing portion and the axial opening with a radius from the axis that remains at least approximately constant along a length parallel to the axis; (b) a first heating element that heats the passageway throughout a first range that encompasses a portion of the passageway defined by the first straight portion; (c) a second heating element that heats the passageway throughout a second range that encompasses a portion of the passageway defined by the first straight portion above the first range; and (d) a third heating element that heats the passageway to a temperature of 100° C. to 200° C. throughout a third range that encompasses a portion of the passageway defined by the second straight portion.

According to an eighteenth aspect, the seventeenth aspect further comprising: an optical fiber preform disposed within the passageway; and optical fiber drawn from the optical fiber preform and extending through the passageway and out the axial opening; wherein, the first range that the first heating element heats encompasses a tip of the optical fiber preform; wherein, the second range that the second heating element heats is at least partially above a main body of the optical fiber preform; and wherein, the third range that the third heating element heats encompasses a portion of the optical fiber drawn from the optical fiber preform.

According to a nineteenth aspect, any one of the seventeenth through eighteenth aspects, further comprising: an upper inlet into the passageway disposed closer to the first straight portion than the narrowing portion; wherein, inert gas flows (i) through the upper inlet and into the passageway, (ii) then along the first straight portion of the inner surface of the muffle, (iii) then along the narrowing portion of the inner surface of the muffle, (iv) then along the second straight portion of the inner surface of the muffle, and (v) then out the axial opening; and wherein, the inert gas comprises one or more of argon and nitrogen, and less than 1 percent by volume helium.

According to a twentieth aspect, the eighteenth aspect, wherein the optical fiber exits the axial opening at a rate of at least 20 meters per second and has a diameter after exiting the axial opening, the standard deviation of which diameter is less than 0.06 µm at measurement frequencies of 0.1 Hz, 1 Hz, and 10 Hz.

DETAILED DESCRIPTION

Figure 1:
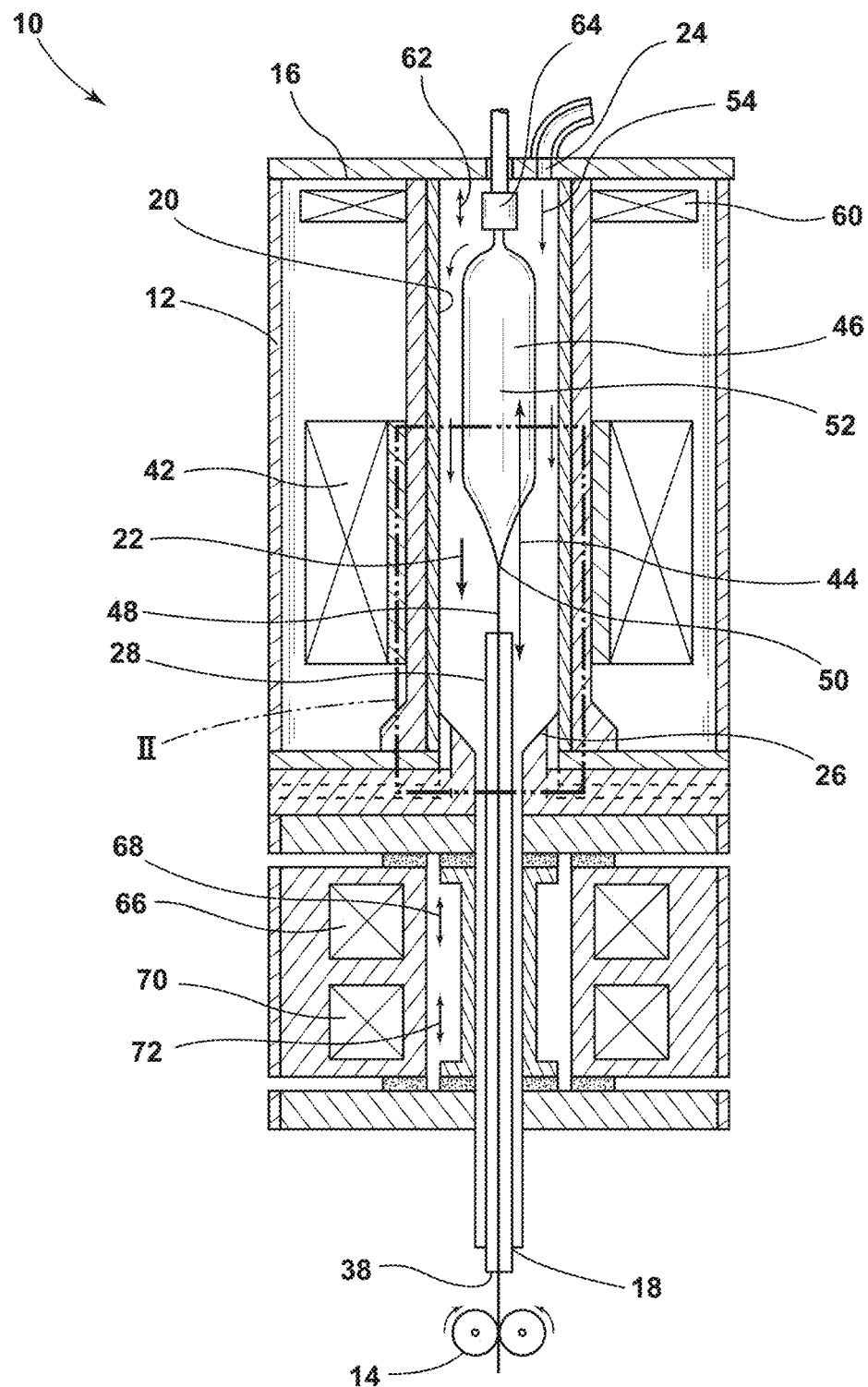
FIG. 1 is a schematic elevational view of an embodiment of an optical fiber forming apparatus, illustrating a draw furnace with a muffle with an inner surface that defines a passageway, and a tube extending into the passageway, with optical fiber drawn from an optical fiber preform extending through the tube.
Figure 2:
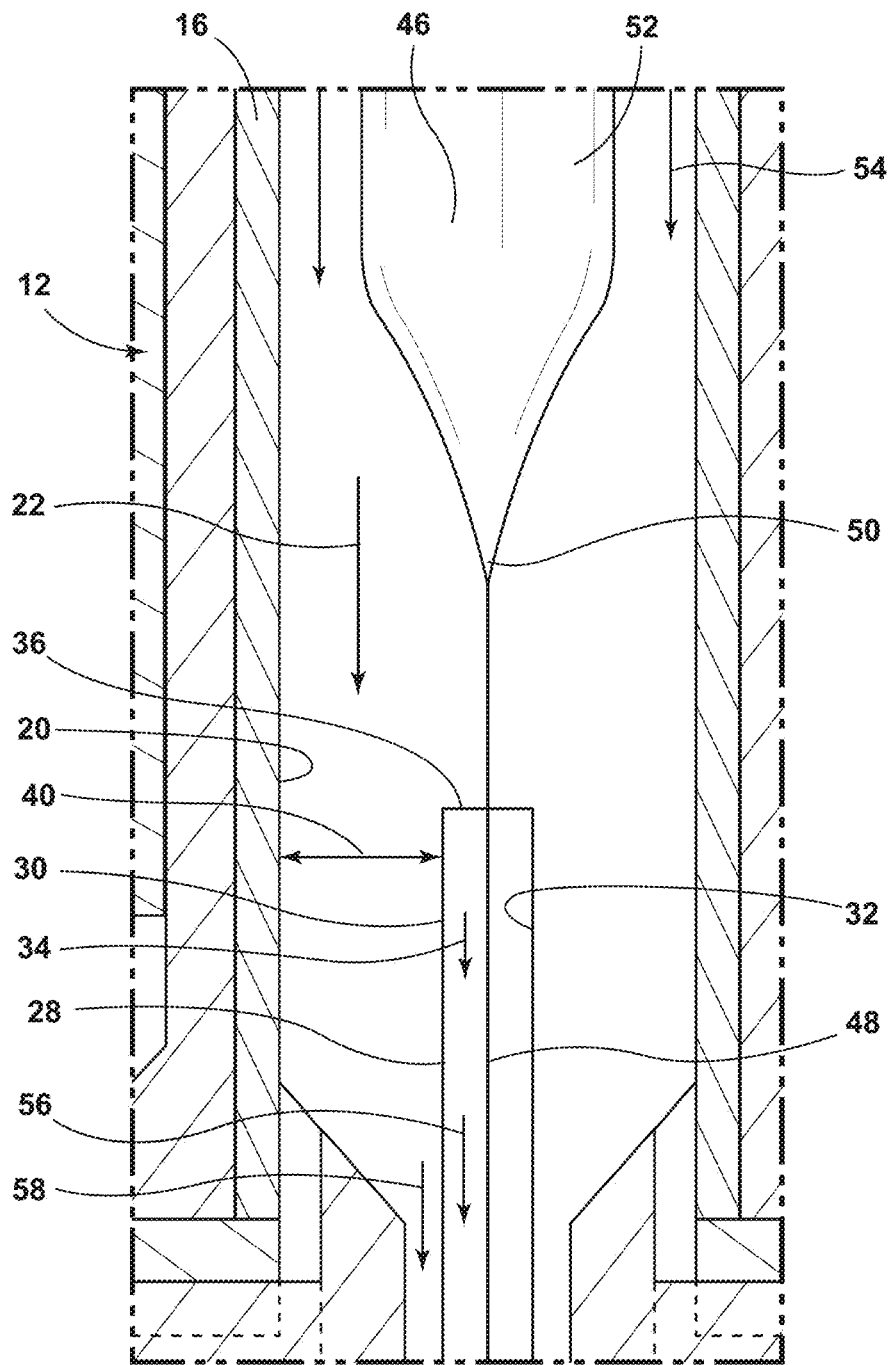
FIG. 2 is a view of area II of FIG. 1, illustrating the tube separated from the inner surface of the muffle and inert gas flowing through a second passageway of the tube as an inner stream and between the tube and the inner surface of the muffle as an outer steam.

Referring now to FIGS. 1-2, an embodiment of an optical fiber forming apparatus 10 is illustrated. The optical fiber forming apparatus 10 includes a draw furnace 12 and a tensioning station 14. The draw furnace 12 includes a muffle 16 and an axial opening 18 below the muffle 16. The muffle 16 has an inner surface 20. The inner surface 20 defines a passageway 22 that extends through the axial opening 18. The draw furnace 12 further includes an upper inlet 24 into the passageway 22. The muffle 16 further includes a narrowing 26 where the diameter of the passageway 22 narrows as the narrowing 26 progresses towards the axial opening 18.

The optical fiber forming apparatus 10 further includes a tube 28. The tube 28 extends into the passageway 22 of the draw furnace 12. The tube 28 is thus at least partially disposed between the axial opening 18 and the upper inlet 24 into the passageway 22. In embodiments such as the illustrated embodiment, the tube 28 extends through the axial opening 18. In other embodiments, the tube 28 is entirely within the passageway 22 and does not extend through the axial opening 18. In any event, at least a portion of the tube 28 is disposed above the axial opening 18 within the passageway 22. The tube 28 extends upwards above the narrowing 26.

The tube 28 includes an outer surface 30, an inner surface 32 that defines a second passageway 34 extending through the tube 28, an inlet 36 into the second passageway 34 of the tube 28, and an outlet 38 out of the second passageway 34 of the tube 28. The inlet 36 of the tube 28 is disposed within the passageway 22 of the draw furnace 12, above the narrowing 26. The outlet 38 need not be disposed within the passageway 22 of the draw furnace 12 but can be so disposed. The inner surface 20 of the muffle 16 surrounds the outer surface 30 of the tube 28 for the portion of the tube 28 that is disposed within the passageway 22 of the draw furnace 12. A space 40 separates the outer surface 30 of the tube 28 from the inner surface 20 of the muffle 16. That is, the tube 28 does not touch the muffle 16 within the passageway 22 of the draw furnace 12.

The draw furnace 12 further includes a first heating element 42 that is in thermal communication with the muffle 16. The first heating element 42 heats the passageway 22 of the draw furnace 12 throughout at least a first range 44 that encompasses at least a portion of the passageway 22 of the draw furnace 12 above the inlet 36 of the tube 28. In operation of the optical fiber forming apparatus 10, an optical fiber preform 46 is disposed within the passageway 22 of the draw furnace 12. The first heating element 42 heats the optical preform 46 sufficiently to decrease the viscosity of the optical fiber preform 46 and allow an optical fiber 48 to be drawn from the optical fiber preform 46. The first range 44 that the first heating element 42 heats encompasses a tip 50 of the optical fiber preform 46, which is where the optical fiber preform 46 transitions to the optical fiber 48 drawn therefrom. In embodiments, the first heating element 42 heats the first range 44 to a temperature of 1700° C. to 2000° C., such as 1700° C., 1800° C., 1900° C., or 2000° C., or any range having any two of these values as endpoints. The passageway 22 of the draw furnace 12 within the first range 44 may have a temperature which is elevated relative to the rest of the passageway 22. The first range 44 can further encompass a main body 52 of the optical fiber preform 46, which is above the tip 50 and from which the tip 50 descends.

The optical fiber 48 drawn from the optical fiber preform 46 extends through the second passageway 34 of the tube 28. In other words, the optical fiber 48 drawn from the optical preform 46 extends into the inlet 36 of the tube 28, then through the second passageway 34 of the tube 28, and then out of the outlet 38 of the tube 28. In embodiments, the optical fiber 48 that enters into the inlet 36 of the tube 28 has a diameter that is greater than 125 μm, while the inlet 36 of the tube 28 has an inner diameter of 1.27 cm to 2.54 cm. An inner diameter of the tube 28 at the inlet 36 smaller than 1.27 cm poses an appreciable risk that the optical fiber 48 could contact the inlet 36 or the inner surface 32 of the tube 36. An inner diameter of the tube 28 at the inlet 36 larger than 2.54 cm would likely result in a sufficiently large distance between the inner surface 32 of the tube 28 and the optical fiber 48 that causes convection of inert gas 54 thus negatively affecting diameter variability. In embodiments, the inner diameter of the tube 28 at the inlet 36 is 100 to 200 times larger than the diameter of the optical fiber 48 that enters the inlet 36 of the tube 28. The tensioning station 14 is in contact with the optical fiber 48 and maintains the optical fiber 48 at a desired tension.

In embodiments, inert gas 54 flows through the upper inlet 24 of the draw furnace 12 and into the passageway 22 of the draw furnace 12. The inert gas 54 then forms separate streams—an inner stream 56 and an outer stream 58. The inner stream 56 flows into the inlet 36 of the tube 28, through the second passageway 34 of the tube 28, and out the outlet 38 of the tube 28. The outer stream 58 flows though the passageway 22 of the draw furnace 12 in the space 40 between the inner surface 20 of the muffle 16 and the outer surface 30 of the tube 28 and then out the axial opening 18 of the draw furnace 12.

In embodiments, the inert gas 54 comprises argon or nitrogen, or a combination of argon and nitrogen. In embodiments, the inert gas 54 comprises one or more of argon and nitrogen, and less than 1 percent by volume helium. In embodiments, the inert gas 54 comprises no intentionally included helium. In embodiments, the inert gas 54 comprises essentially pure argon (e.g., more than 99 percent by volume argon).

In embodiments, the tube 28 comprises one or more graphite, quartz, and stainless steel. In embodiments, the tube 28 is stainless steel.

In embodiments, the optical fiber forming apparatus 10 further includes a second heating element 60. The second heating element 60 is disposed vertically above the first heating element 42. The second heating element 60 heats the passageway 22 of the draw furnace 12 throughout at least a second range 62 that encompasses at least a portion of the passageway 22 of the draw furnace 12 above the first range 44. The second range 62 encompasses a portion of the passageway 22 above the main body 52 of the optical fiber preform 46. In embodiments, the second range 62 encompasses a boule 64 that supports the optical fiber preform 46.

In embodiments, the optical fiber forming apparatus 10 further includes a third heating element 66. The third heating element 66 is disposed vertically below the first heating element 42. The third heating element 66 heats the passageway 22 of the draw furnace 12 throughout a third range 68 that encompasses a portion of the second passageway 34 of the tube 28. The third range 68 is vertically below the first range 44. The third heating element 66 thus heats both a portion of the passageway 22 of the draw furnace 12 disposed around the tube 28 as well as the second passageway 34 of the tube 28.

In embodiments, the optical fiber forming apparatus 10 further includes a cooling element 70. The cooling element 70 is disposed vertically below the first heating element 42. The cooling element 70 cools the passageway 22 of the draw furnace 12 throughout a fourth range 72 that encompasses a portion of the second passageway 34 of the tube 28. The fourth range 72 is vertically below the first range 44. The cooling element 70 cools the optical fiber 48 drawn from the optical fiber preform 46 as the optical fiber 48 passes through the second passageway 34 of the tube 28 toward the tensioning station 14.

As will be further demonstrated in the examples below, the optical fiber forming apparatus 10 that includes the tube 28 extending throughout a portion of the passageway 22 of the draw furnace 12 produces optical fiber 48 that has a diameter, the standard deviation of which is within an improved and acceptable tolerance. In embodiments, the optical fiber 48 exits the outlet 38 of the tube 28 at a rate of at least 20 m/s and has a diameter after exiting the outlet 38 of the tube 28, the standard deviation of which diameter is less than 0.1 µm at frequencies of 0.1 Hz, 1 Hz, and 10 Hz. In embodiments, the optical fiber 48 exits the outlet 38 of the tube 28 at a rate of at least 20 m/s and has a diameter after exiting the outlet 38 of the tube 28, the standard deviation of which diameter is less than 0.1 µm at frequencies of 0.06 Hz, 1 Hz, and 10 Hz.

The position of the tube 28 within the passageway 22 of the draw furnace 12 is adjustable. This aspect provides many advantages. The inlet 36 of the tube 28 can be extended relatively close to the tip 50 of the optical fiber preform 46 and, thus, protect the optical fiber 48 from disturbances in flow of the inert gas 54 during much of the period of time while the optical fiber 48 is cooling. In the same manner, the length of the tube 28 between the inlet 36 of the tube 28 and the outlet 38 of the tube 28 can be adjusted as desired to protect the optical fiber 48 from disturbances from the inert gas 54 or ambient air while the optical fiber 48 is cooling. In some circumstances, it may be desirable to size the length of the tube 28 to extend out of the passageway 22 through the axial opening 18, to allow additional distance and time for the optical fiber 48 to cool before becoming exposed to flow instabilities caused by the temperature difference between the optical fiber 48 and the ambient air.

Figure 3:
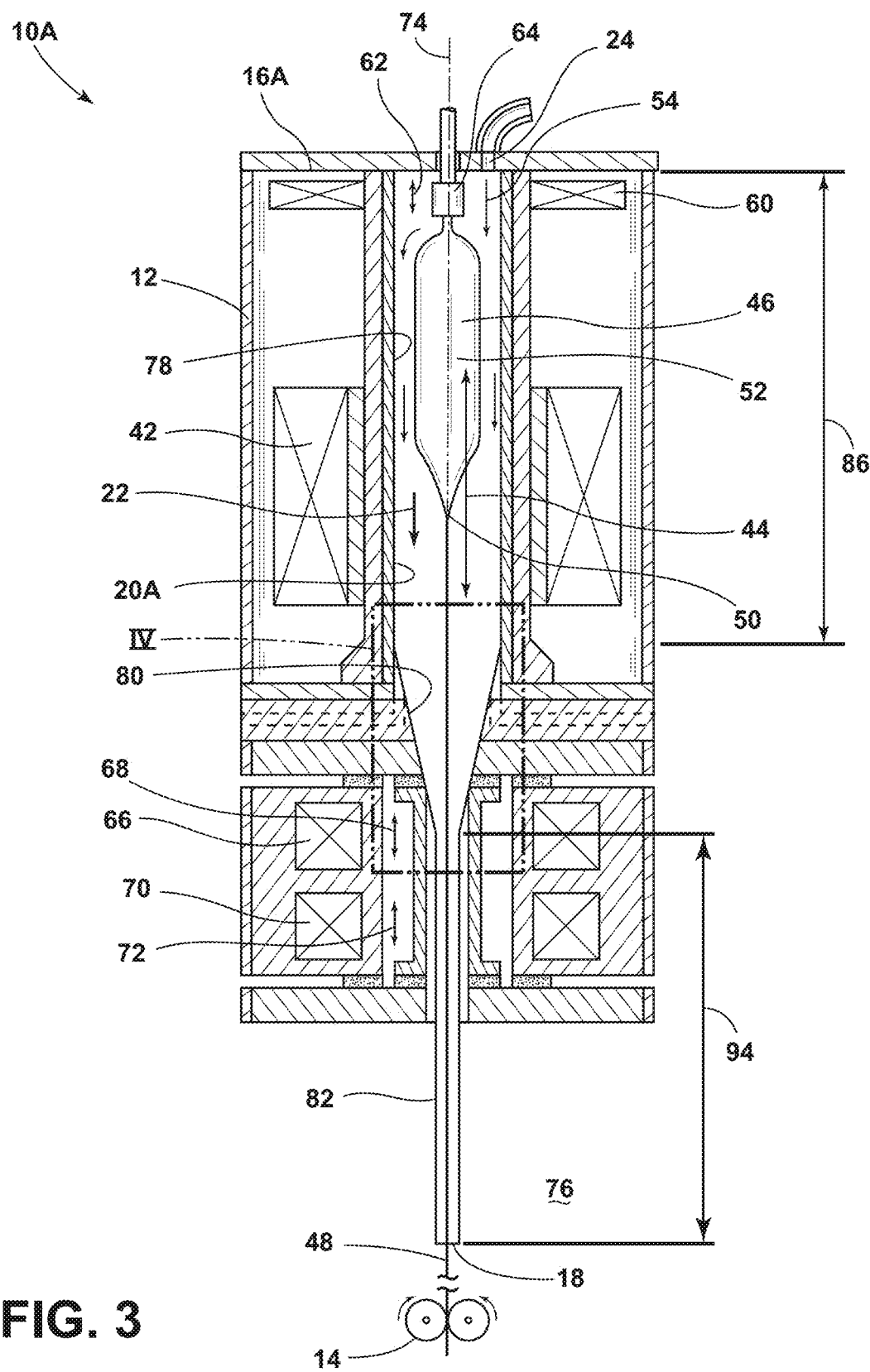
FIG. 3 is a schematic elevational view of another embodiment of an optical fiber forming apparatus, illustrating a first straight portion, a tapered portion, and then a second straight portion of an inner surface of a muffle defining a passageway, and drawn optical fiber extending through the passageway.
Figure 4:
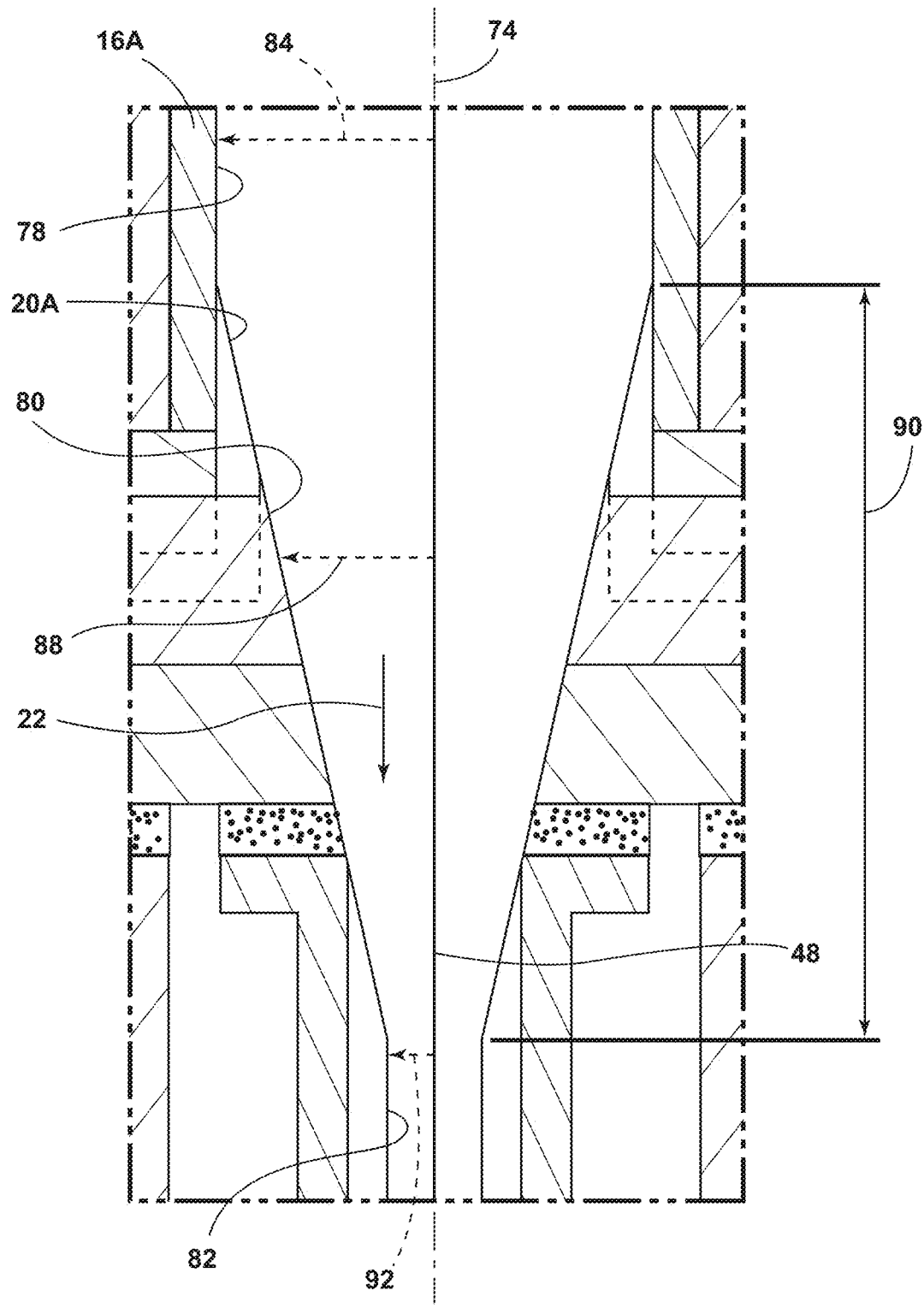
FIG. 4 is a view of area IV of FIG. 1, illustrating the tapered portion separated from an axis through the passageway by a radius, and the radius decreases along the tapered portion from the first straight portion toward the second straight portion.

Referring now to FIGS. 3-4, another embodiment of an optical fiber forming apparatus 10A is illustrated. Numbers appearing in FIGS. 3 and 4 that are the same as numbers appearing in FIGS. 1 and 2 refer to like elements. The optical fiber forming apparatus 10A includes a draw furnace 12A with a muffle 16A and an axial opening 18 below the muffle 16A. The muffle 12A has an inner surface 20A. The inner surface 20A defines a passageway 22 centered about an axis 74. The passageway 22 extends through the axial opening 18 into the ambient environment 76.

The inner surface 20A includes a first straight portion 78, a tapered portion 80 below the first straight portion 78, and a second straight portion 82 below the tapered portion 80. In other words, the tapered portion 80 is disposed vertically between the first straight portion 78 and the second straight portion 82, and vertically between the first straight portion 78 and the axial opening 18. In embodiments, the first straight portion 78 surrounds the optical fiber preform 46. The first straight portion 78 has a radius 84 from the axis 74. The radius 84 remains constant (or at least approximately constant, such as, as constant as manufacturing tolerances allow) along a length 86 parallel to the axis 74.

The tapered portion 80 includes a radius 88 from the axis 74 that decreases toward the axial opening 18, thus narrowing the passageway 22. The tapered portion 80 has a vertical length 90 parallel to the axis 74 that is at least two times longer than the largest radius 88 of the tapered portion 80. In embodiments, the tapered portion 80 has a slope (i.e., a rate of change of the radius 88 as a function of position along the vertical length 90) that is constant. In other embodiments, the slope of the tapered portion 80 is irregular—that is, not constant. In embodiments, the vertical length 90 is at least 40 cm, such as 40 cm to 80 cm.

The second straight portion 82 is disposed vertically between the tapered portion 80 and the axial opening 18. The second straight portion 82 includes a radius 92 from the axis 74. The radius 92 remains constant (or at least approximately constant) along a length 94. The length 94 is at least 75 cm. In embodiments, the length 94 is 75 cm to 200 cm, such as 75 cm to 150 cm, 100 cm to 150 cm, and 125 cm to 150 cm. In embodiments, the diameter of the second straight portion 82 (i.e., twice the radius 92) is 1.27 cm to 2.54 cm. That is, in embodiments, the radius 92 of the second straight portion 82 is 0.635 cm to 1.27 cm. Again, a diameter smaller than 1.27 cm poses a risk of contacting the optical fiber 48.

The draw furnace 12A further includes an upper inlet 24 into the passageway 22. The upper inlet 24 is disposed closer to the first straight portion 78 than to the tapered portion 80 of the inner surface 20A of the muffle 16A, such as above the first straight portion 78 or through the first straight portion 78.

The draw furnace 12A further includes a first heating element 42. The first heating element 42 heats the passageway 22 throughout a first range 44 that is disposed above the tapered portion 80. In embodiments, the draw furnace 12A further includes a second heating element 60. The second heating element 60 heats the passageway 22 through a second range 62 that is disposed above the first range 44. In embodiments, the draw furnace 12A further includes a third heating element 66. The third heating element 66 heats a third range 68 that encompasses a portion of the passageway 22 that the second straight portion 82 of the inner surface 20A of the muffle 16A defines.

During operation of the draw furnace 12A, inert gas 54 flows (i) through the upper inlet 24 and into the passageway 22, (ii) then along the first straight portion 78 of the inner surface 20A of the muffle 16A, (iii) then along the tapered portion 80, (iv) then along the second straight portion 82, and (v) then out the axial opening 18. In embodiments, the inert gas 54 is argon. In embodiments, the inert gas 54 is nitrogen. In embodiments, the inert gas 54 comprises argon and nitrogen. In embodiments, the inert gas 54 comprises less than 1 percent by volume helium, such as no deliberately added helium and the only helium in the inert gas 54 is inadvertent trace amounts.

The optical fiber preform 46 is disposed within the passageway 22. The first range 44 that the first heating element 42 heats encompasses a tip 50 of the optical fiber preform 46. If included, the second range 62 that the second heating element 60 heats encompasses a portion of the passageway 22 above a main body 52 of the optical fiber preform 46. Optical fiber 48 is drawn from the optical fiber preform 46, extending downward from the tip 50. The optical fiber 48 extends through the passageway 22 and exits out the axial opening 18 to a tensioning station 14. In embodiments, the optical fiber 48 that enters the passageway 22 that the second straight portion 82 of the inner surface 20A of the muffle 16A defines has a diameter that is greater than 125 µm.

As will be further demonstrated in the examples below, the draw furnace 12A that includes the passageway 22 that the tapered portion 80 and the second straight portion 82 defines produces optical fiber 48 that has a diameter, the standard deviation of which is within an improved and acceptable tolerance. In embodiments, the optical fiber 48 exits the axial opening 18 at a rate of at least 20 m/s. In embodiments, the optical fiber 48 after exiting the axial opening 18 has a diameter, the standard deviation of which is less than 0.6 µm at measurement frequencies of 0.1 Hz, 1 Hz, and 10 Hz.

Figure 5:
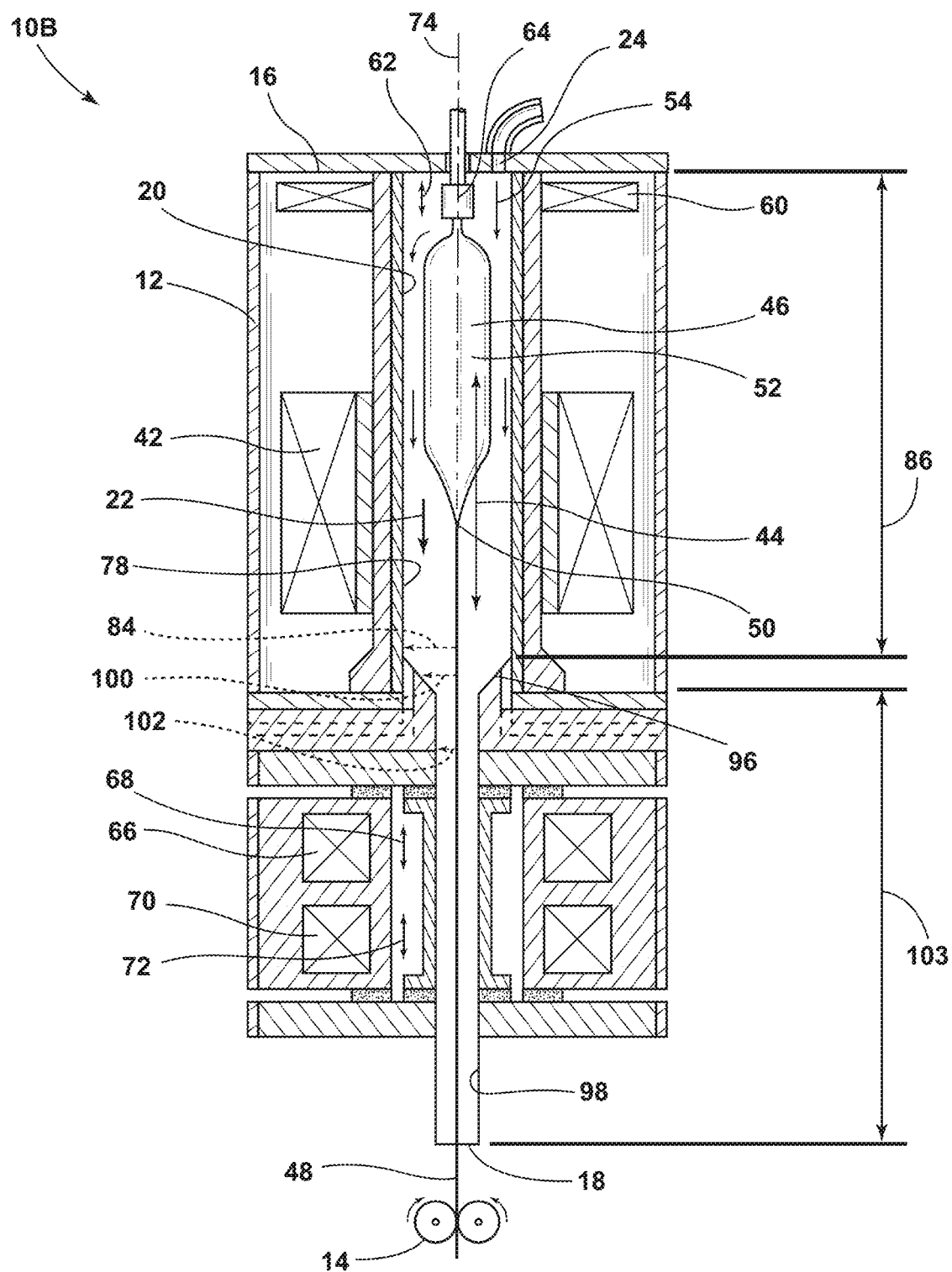
FIG. 5 is a schematic elevational view of another embodiment of an optical fiber forming apparatus, illustrating a heating element heating a range that encompasses a passageway defined by a second straight portion of an inner surface of a muffle through which drawn optical fiber extends.

Referring now to FIG. 5, another embodiment of an optical fiber forming apparatus 10B is illustrated. Numbers appearing in FIG. 5 that are the same as numbers appearing in FIGS. 1 and 4 refer to like elements. The optical fiber forming apparatus 10B includes a draw furnace 12. The draw furnace 12 includes a muffle 16 and an axial opening 18 below the muffle 16. The muffle 16 has an inner surface 20. The inner surface 20 of the muffle 16 defines a passageway 22 centered about an axis 74 and that extends through the axial opening 18.

The inner surface 20 of the muffle 16 includes a first straight portion 78, a narrowing portion 96, and a second straight portion 98. The first straight portion 78 has a radius 84 from the axis 74 that remains at least approximately constant along a length 86 parallel to the axis 74. The narrowing portion 96 is disposed vertically between the first straight portion 78 and the second straight portion 98, and disposed vertically between the first straight portion 78 and the axial opening 18. The narrowing portion 96 includes a radius 100 from the axis 74 that decreases going away from the first straight portion 78 thus narrowing the passageway 22. The second straight portion 98 is disposed vertically below the narrowing portion 96. The second straight portion 98 is disposed between the narrowing portion 96 and the axial opening 18. The second straight portion 98 has a radius 102 from the axis 74 that remains at least approximately constant along a length 103 parallel to the axis 74.

The draw furnace 12 further includes a first heating element 42, a second heating element 60, and a third heating element 66. The first heating element 42 heats the passageway 22 throughout a first range 44 that encompasses a portion of the passageway 22 defined by the first straight portion 78. The second heating element 60 heats the passageway 22 throughout a second range 62 that encompasses a portion of the passageway 22 defined by the first straight portion 78 above the first range 44. That is, the second heating element 60 is disposed vertically above the first heating element 42. The third heating element 66 heats the passageway 22 throughout a third range 68 that encompasses a portion of the passageway 22 defined by the second straight portion 98. That is, the third heating element 66 is disposed vertically below the first heating element 42.

In use, the draw furnace 12 further includes an optical fiber preform 46 disposed within the passageway 22. The first range 44 that the first heating element 42 heats encompasses a tip 50 of the optical fiber preform 46. The second range 62 that the second heating element 60 heats is at least partially above the main body 52 of the optical fiber preform 46. Optical fiber 48 is drawn from the optical fiber preform 46 and extends through the passageway 22 and out the axial opening 18. The third range 68 that the third heating element 66 heats encompasses a portion of the optical fiber 48 drawn from the optical fiber preform 46. In embodiments, the third heating element 66 heats the third range 68 to a temperature of 100° C. to 200° C., such as 125° C. to 175° C., about 150° C., or 150° C.

The draw furnace 12 further includes an upper inlet 24 into the passageway 22. The upper inlet 24 is disposed closer to the first straight portion 78 of the inner surface 20 of the muffle 16 than the narrowing portion 96 of the inner surface 20 of the muffle 16. In embodiments, the upper inlet 24 is disposed vertically above the main body 52 of the optical fiber preform 46. Inert gas 54 flows (i) through the upper inlet 24 and into the passageway 22, (ii) then along the first straight portion 78 of the inner surface 20 of the muffle 16, (iii) then along the narrowing portion 96 of the inner surface 20 of the muffle 16, (iv) then along the second straight portion 98 of the inner surface 20 of the muffle 16, and (v) then out the axial opening 18. In embodiments, the inert gas 54 is argon. In embodiments, the inert gas is nitrogen. In embodiments, the inert gas 54 is one or more of argon and nitrogen. In embodiments, the inert gas 54 comprises one or more of argon and nitrogen, and less than 1% by volume helium, such as no intentionally added helium.

As will become more apparent in the examples below, utilization of the third heating element 66 to heat a third range 68 that encompasses the passageway 22 defined by the second straight portion 98 results in optical fiber 48 having a diameter with acceptable variability when a non-helium inert gas is utilized. In embodiments, the optical fiber 48 exits the axial opening 18 at a rate of at least 20 m/s and has a diameter after exiting the axial opening 18, the standard deviation of which is less than 0.06 µm at measurement frequencies of 0.1 Hz, 1 Hz, and 10 Hz.

EXAMPLES

Example 1 and Comparative Examples 1A and 1B

For these examples, a computation fluid dynamics simulation (ANSYS Fluent v 17.2, ANSYS, Inc., Canonsburg, Pennsylvania, USA) was utilized to produce stream function contour plots for various scenarios. For Example 1, a stream function contour plot was generated for argon as the inert gas 54 flowing through the optical fiber forming apparatus 10 with the tube 28. The tube 28 was assumed to have a ¾" (1.905 cm) inner diameter and to be formed of graphite. This stream function contour plot is reproduced at FIGS. 6A and 6B, and an axial velocity profile of the argon as the inert gas 54 is reproduced at FIG. 6C. For Comparative Example 1A, the same stream function contour plot was generated again for argon as the inert gas 54 but this time flowing through a variation of the optical fiber forming apparatus 10 without the tube 28. This stream function contour plot is reproduced as FIG. 7A. An axial velocity profile of the argon for Comparative Example 1B is reproduced at FIG. 7B. For Comparative Example 1B, the same stream function contour plot was generated but this time utilizing helium as the inert gas 54 and flowing through the variation of the optical fiber forming apparatus 10 without the tube 28. This stream function contour plot is reproduced as FIG. 8. In all scenarios, both the first heating element 42 and the second heating element 60 were activated to raise the temperature within the first range 44 and the second range 62 of the passageway 22 of the draw furnace 12.

Figure 7A:
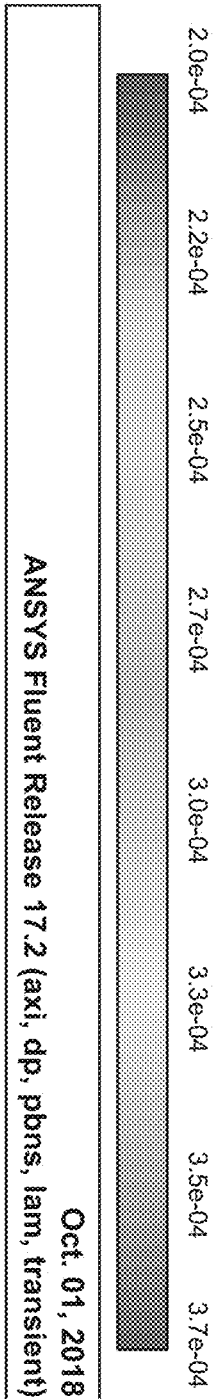
FIG. 7A, relating to a Comparative Example 1A, is a stream function contour plot for the optical fiber forming apparatus of FIG. 1 but without the tube with argon as the inert gas forming convention cells disturbing the optical fiber near the narrowing of the passageway.
Figure 7A:
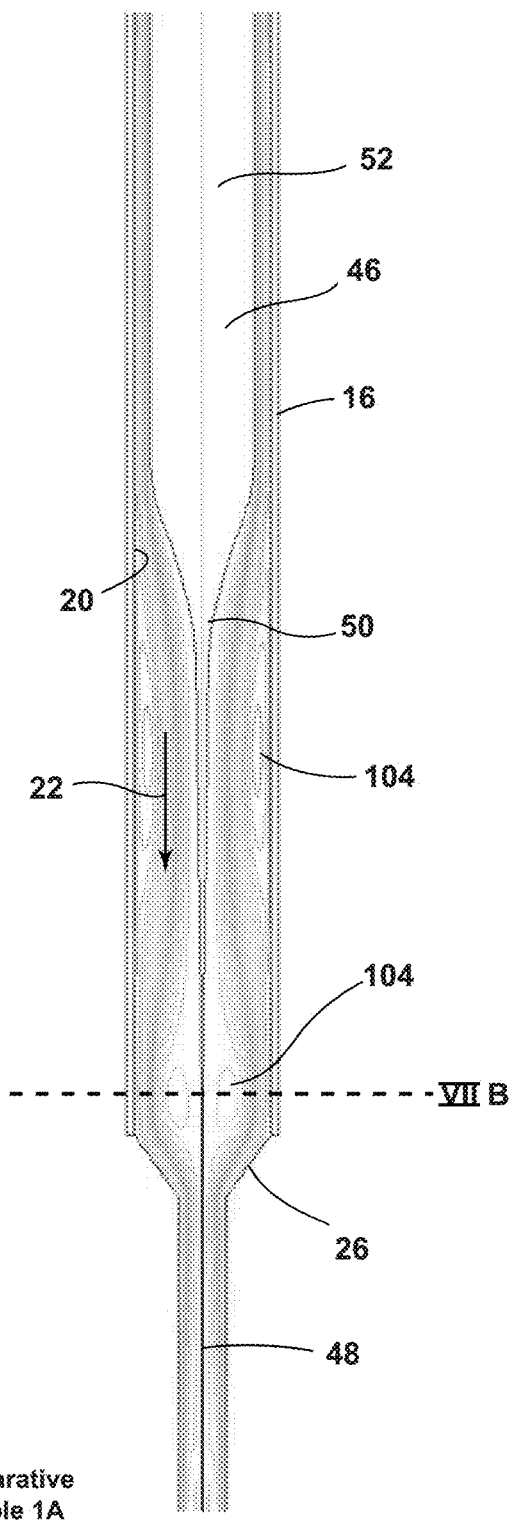
Figure 7B:
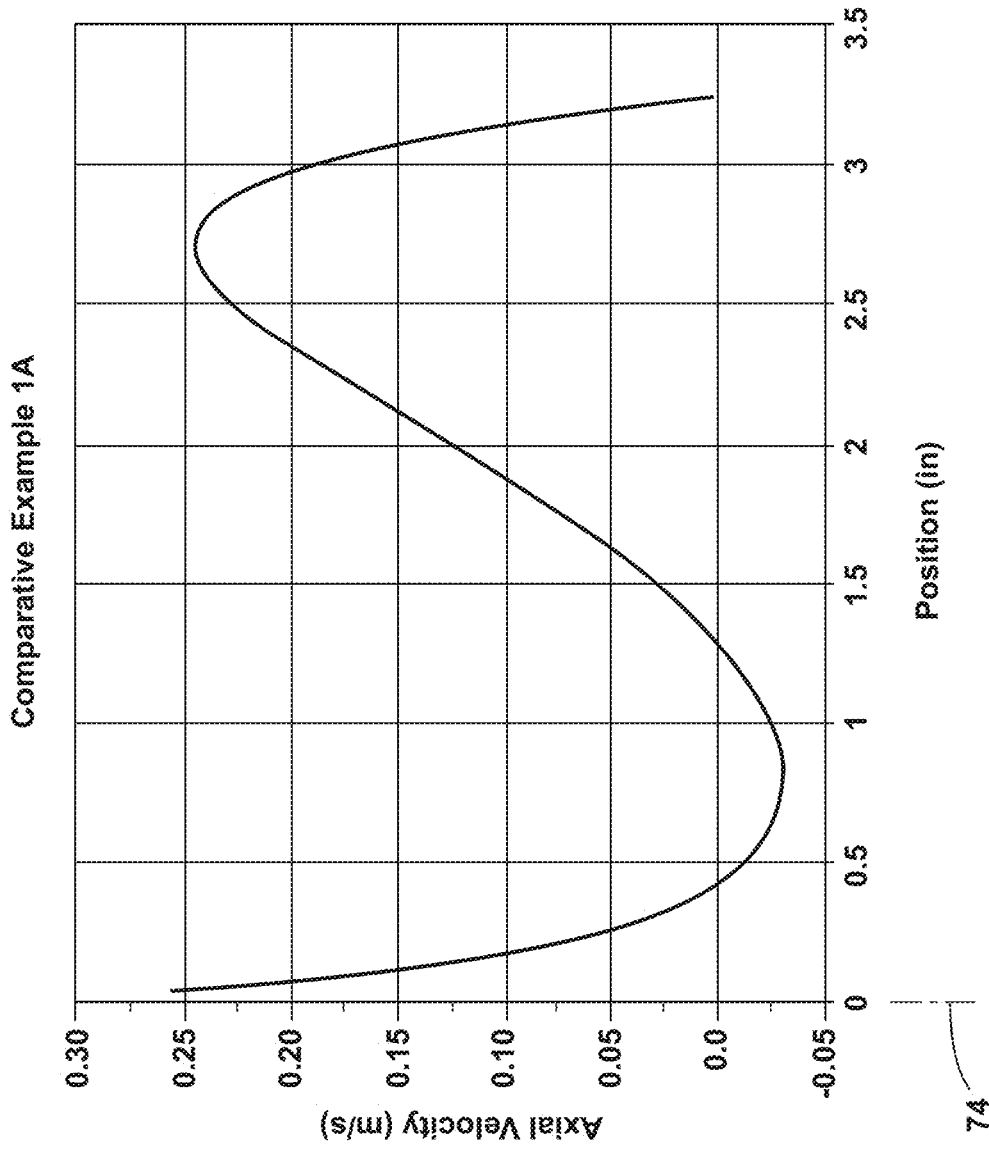
FIG. 7B is a graph of the axial velocity of the argon at line VIIB of FIG. 7A, illustrating negative values near the axis of the passageway and therefore upward flow of argon that disturbs the optical fiber.
Figure 8:
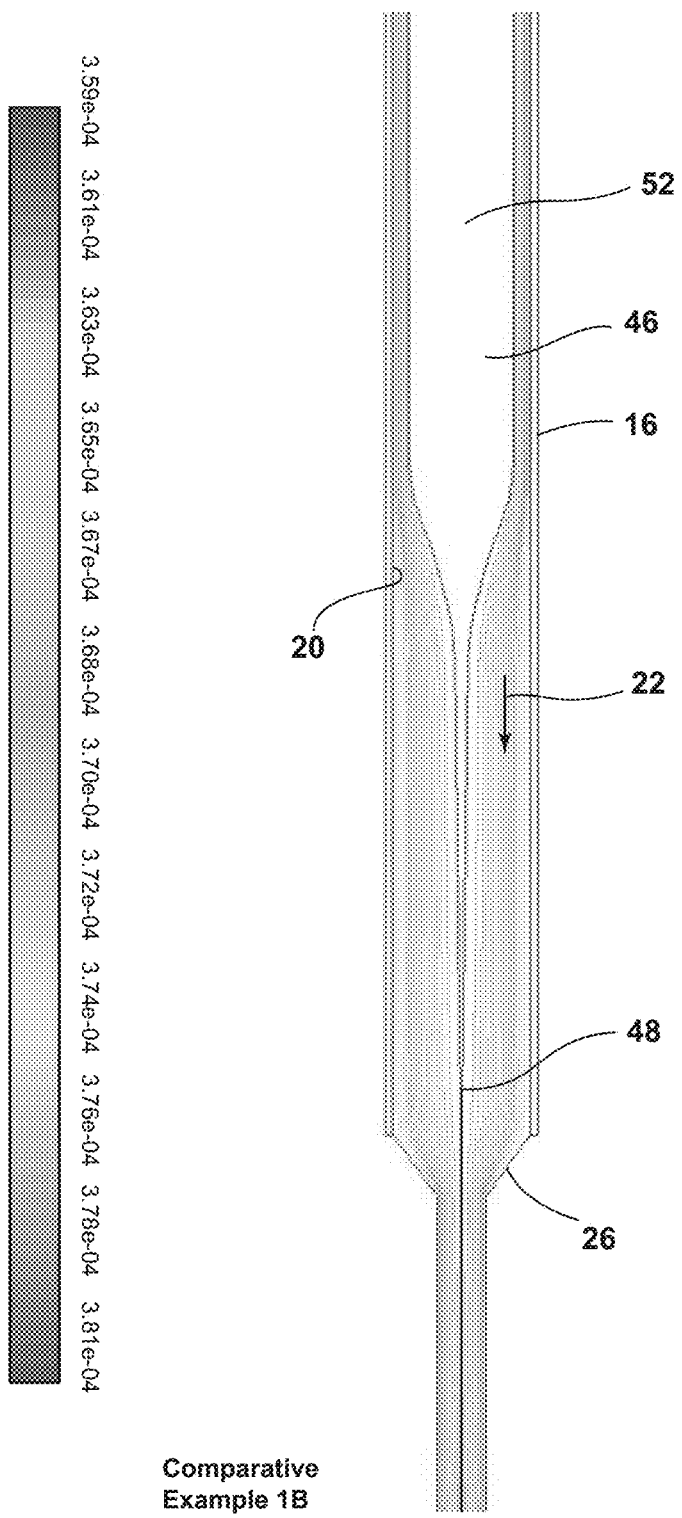
FIG. 8, relating to a Comparative Example 1B, is a stream function contour plot for the optical fiber forming apparatus of FIG. 1 but without the tube with helium as the inert gas not forming convection cells and thus not disturbing the optical fiber near the narrowing of the passageway.

In Comparative Example 1B, the stream function contour plot reproduced at FIG. 8 illustrates that when the passageway 22 is filled with helium as the inert gas 54, a unidirectional consistent flow of the helium results. In other words, there are no well-defined convection cells 104 when helium is utilized as the inert gas 54. However, when the passageway 22 is filled with argon as the inert gas 54 in Comparative Example 1A, convection cells 104 are generated both near the inner surface 20 of the muffle 16 near the tip 50 of the optical fiber preform 46 and above the narrowing 26 of the passageway 22 around the optical fiber 48. These convection cells 104 are illustrated at FIG. 7A. Specifically, the closed lines illustrate circulation of the inert gas 54. The axial velocity profile of the argon at the dotted line VIM identified at FIG. 7A is illustrated at the graph of FIG. 7B. Positive values indicate downward flow toward the axial opening 18, while negative values indicate upward flow. The existence of both positive values and the negative values correspond to circulation of the argon forming the convection cells 104.

Without being bound by theory, it is believed that the convection cells 104 such as those illustrated at FIG. 7A for Comparative Example 1A affect heat transfer within the passageway 22 between the tip 50 of the optical fiber preform 46 and the narrowing 26 of the passageway 22 sufficiently to cause the diameter of the optical fiber 48 to vary significantly. When argon is utilized as the inert gas 54, these convection cells 104 result. However, as illustrated with Comparative Example 1B and the stream function contour plot at FIG. 8, when helium is utilized as the inert gas 54, such convection cells 104 do not manifest and the variability of the diameter of the optical fiber 48 is avoided. Without being bound by theory, it is believed that the relatively high kinematic viscosity of helium compared to argon suppresses the generation of these convection cells 104. The so-called Grashof number (Gr), which is a dimensionless value of natural convection, conceptualizes the relationship between the kinematic viscosity of the inert gas 54 and the natural convection. The Grashof number (Gr) is defined by the following equation:

$$Gr = \frac{g\beta L_c^3 \Delta T}{v^2}$$

where g is the gravitational acceleration, β is the coefficient of thermal expansion, $L_c$ is the characteristic length (which is cubed), ΔT is the temperature difference, and v is the kinematic viscosity of the gas. As is apparent from the equation, when the kinematic viscosity of the inert gas 54 is high, as it is for helium relative to argon, the Grashof number is low, meaning a relatively low convection of the inert gas 54. Everything else being equal, the difference in the kinematic viscosity (v) of helium versus argon (or nitrogen) results in a 70× difference in the Grashof number (Gr).

Figure 6A:
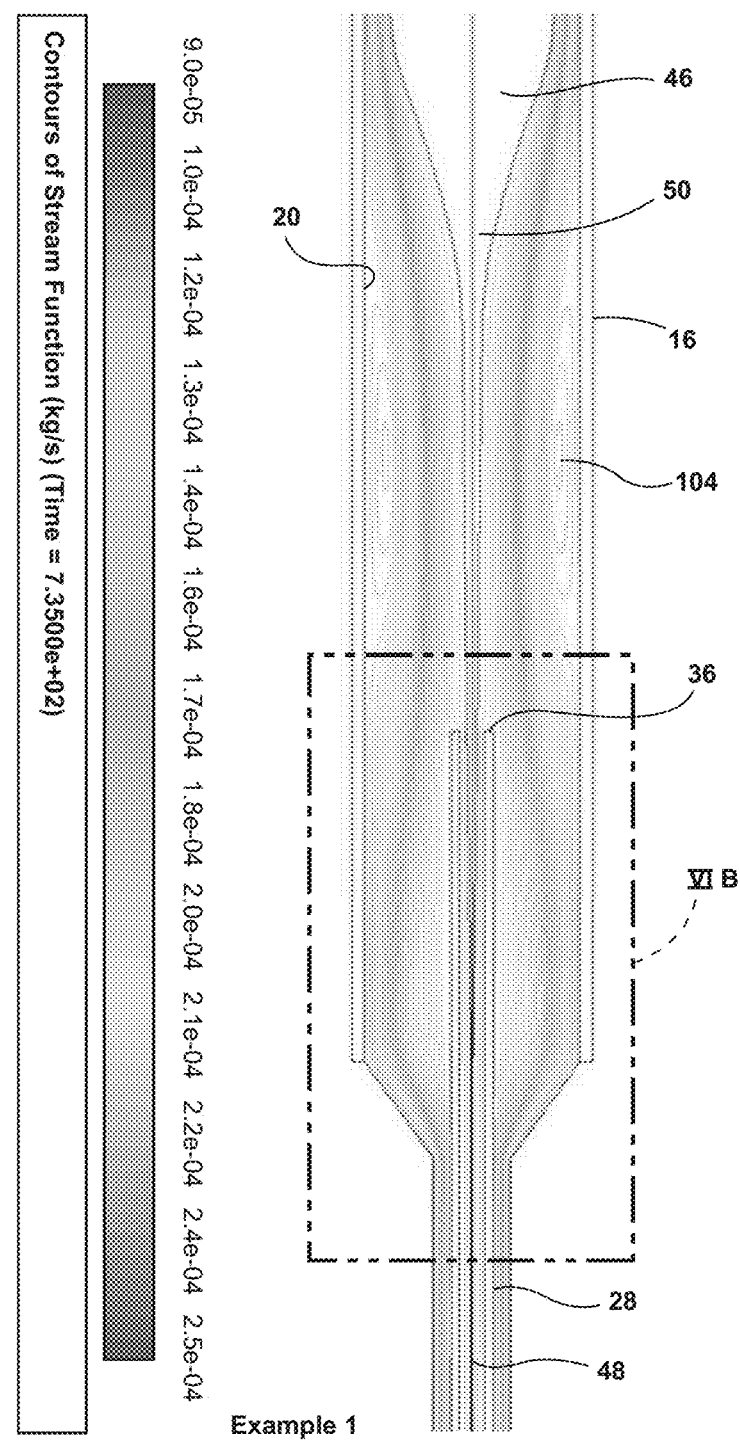
FIG. 6A, relating to an Example 1, is a stream function contour plot generated by a computation fluid dynamics simulation for the optical fiber forming apparatus of FIG. 1 with the tube with argon as an inert gas flowing through the passageway defined by the inner surface of the muffle and the second passageway of the tube, illustrating unidirectional downward flow of argon and a lack of convection cells disturbing the optical fiber.
Figure 6B:
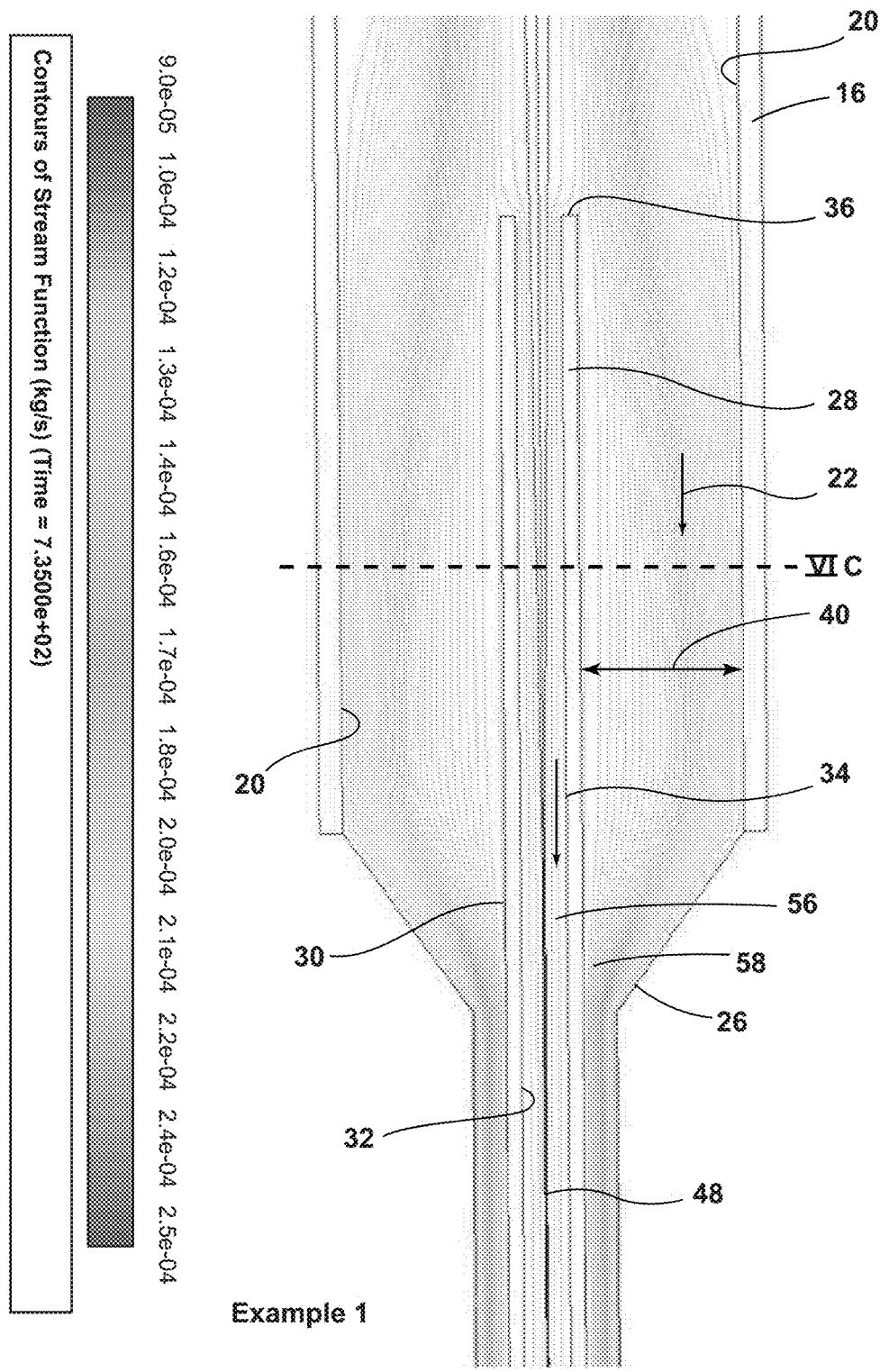
FIG. 6B is area VIB of the stream function contour plot of FIG. 6A.
Figure 6C:
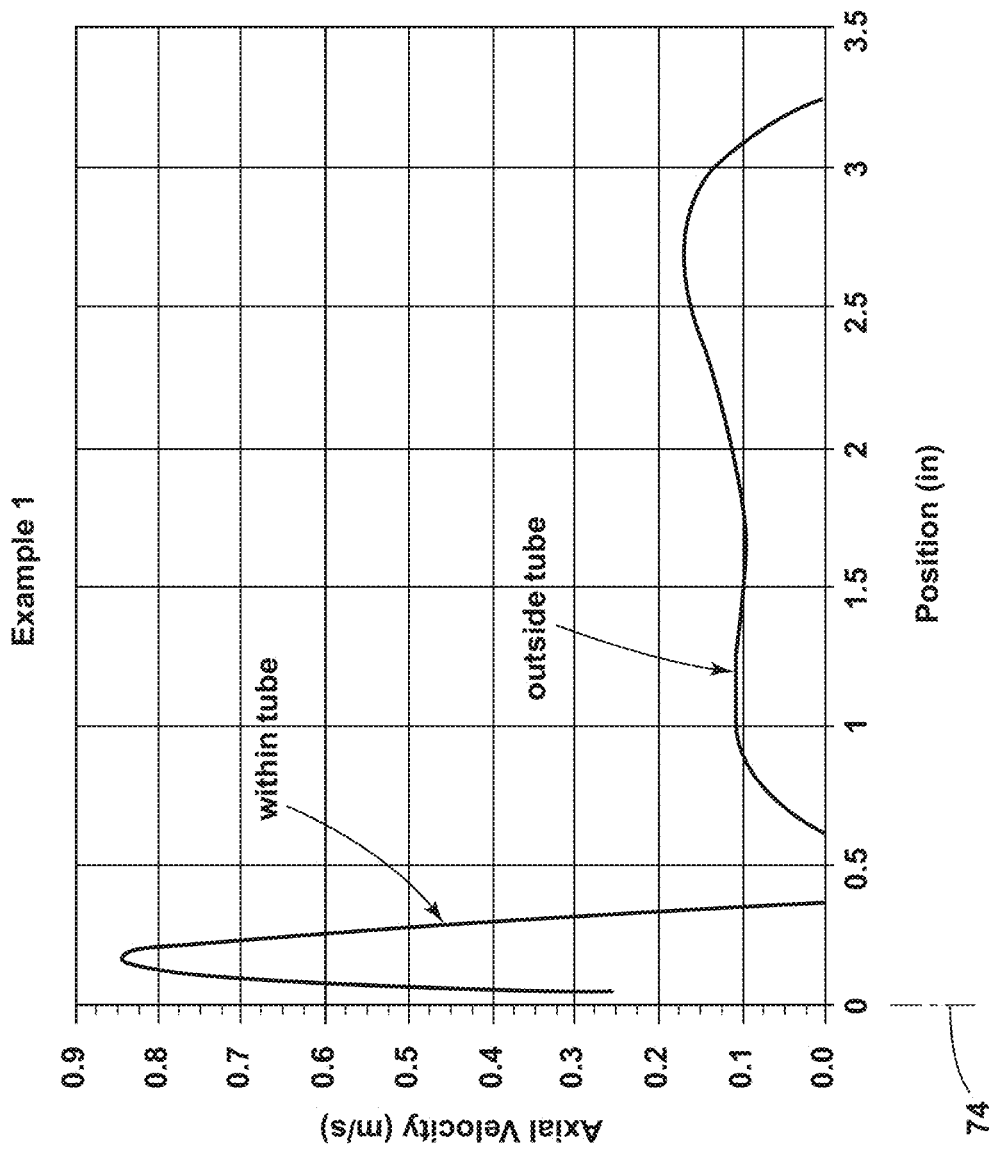
FIG. 6C is a graph of the axial velocity of the argon at line VIC of FIG. 6B, illustrating all positive values for the axial velocity of the argon, which indicates unidirectional downward flow.

However, when the tube 28 is utilized as in Example 1, argon as the inert gas 54 does not form convection cells 104 immediately above the narrowing 26 adjacent to the optical fiber 48. FIGS. 6A and 6B illustrate the lack of convection cells 104 immediately above the narrowing 26 that are apparent in FIG. 7A for Comparative Example 1A. The axial velocity graph at FIG. 6C taken at the line VIC of FIG. 6B illustrates all positive values for the axial velocity of the argon both within the second passageway 34 of the tube 28 and within the first passageway 22 of the draw furnace 12 between the inner surface 20 of the muffle 16 and the outer surface 30 of the tube 28, which indicates unidirectional downward flow. The implementation of the tube 28 results in consistent unidirectional gas flow around the optical fiber 48 drawn from the optical fiber preform 46, which leads to reduced diameter variability. Without being bound by theory, and referring back to the equation for the Grashof number (Gr), the tube 28 reduces the characteristic length $L_c$ value which results in a lower Grashof number (Gr) signifying lower convection. Because the tube 28 divides the inert gas 54 into two separate streams 56, 58, two separate characteristic length $L_c$ values can be analyzed. A first characteristic length $L_c$ value that can be analyzed is the distance of the space 40 between the inner surface 20 of the muffle 16 and the outer surface 30 of the tube 28. Even if this first characteristic length $L_c$ was great, the tube 28 would isolate the optical fiber 48 from any convection cells 104 generated between the inner surface 20 of the muffle 16 and the outer surface 30 of the tube 28. A second characteristic length $L_c$ value that can be analyzed is the distance between the inner surface 32 of the tube 28 and the optical fiber 48 within the tube 28. This distance is purposefully small (such as when the inner diameter of the tube is 2.54 cm or less) thus limiting the second characteristic length $L_c$ value. In other words, this distance is too small for convection cells to generate, even when argon is the inert gas 54. In either circumstance, argon as the inert gas 54 does not generate convection cells 104 that would negatively affect the variability of the diameter of the optical fiber 48.

Figure 9A:
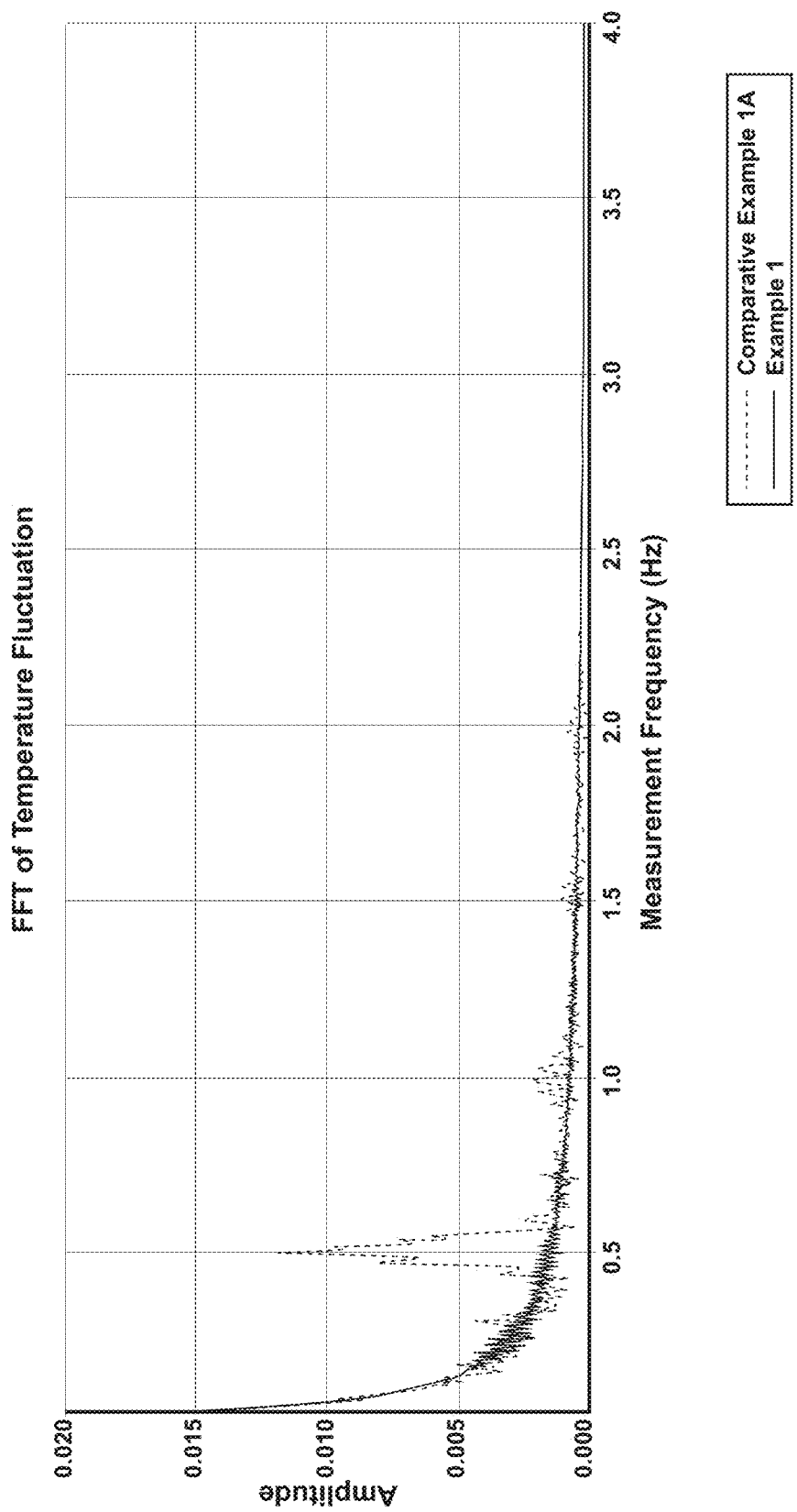
FIG. 9A is a graph of temperature fluctuation for both Example 1 and Comparative Example 1A, illustrating the optical fiber forming apparatus of Example 1 utilizing the tube having less temperature fluctuations, especially at lower measurement frequency, than the optical fiber forming apparatus of Comparative Example 1A not utilizing the tube.
Figure 9B:
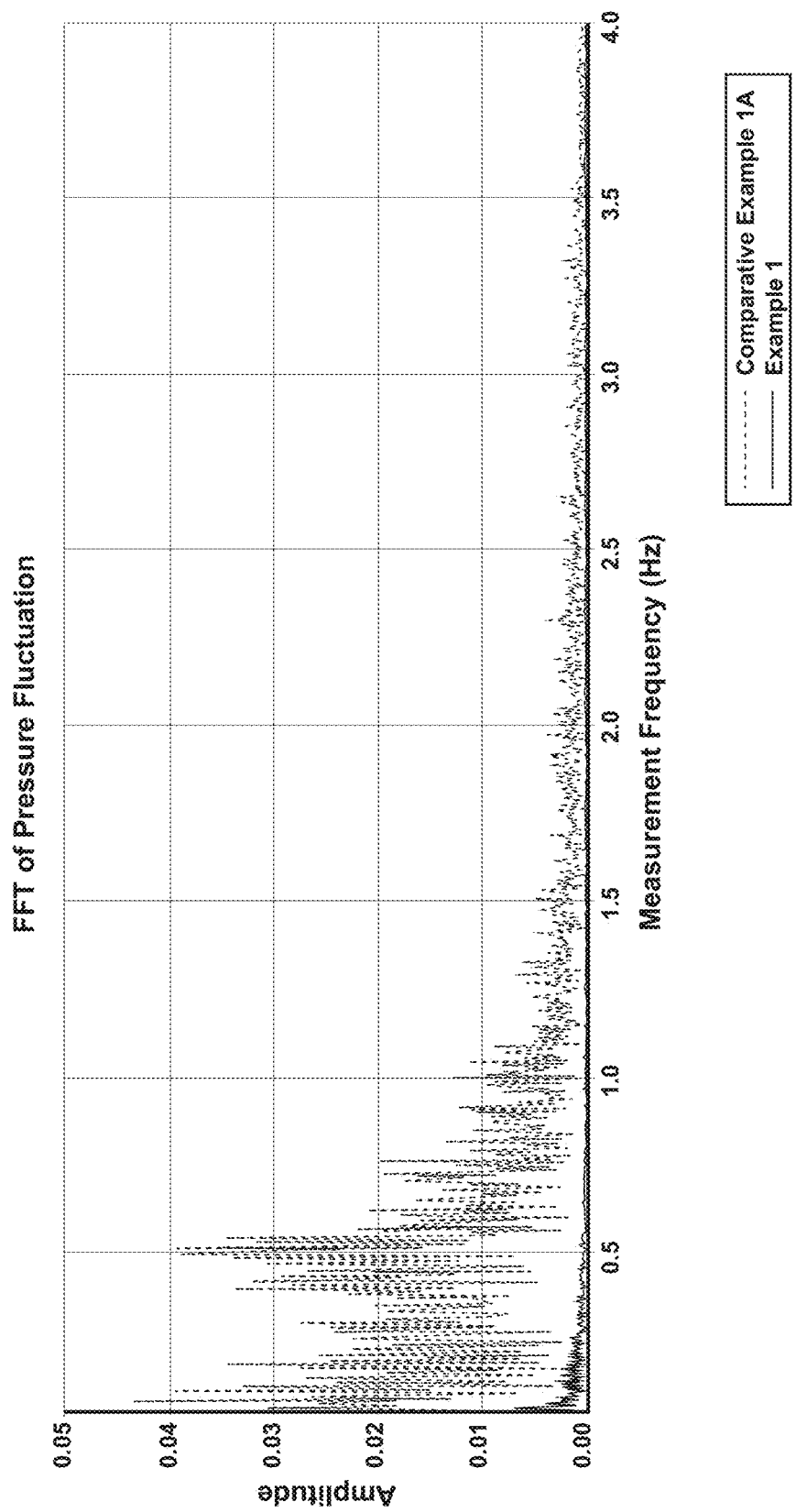
FIG. 9B is a graph of pressure fluctuation for both Example 1 and Comparative Example 1A, illustrating the optical fiber forming apparatus of Example 1 utilizing the tube having less pressure fluctuations, especially at lower measurement frequency, than the optical fiber forming apparatus of Comparative Example 1A not utilizing the tube.

The computational fluid dynamics model further additionally produced temperature fluctuation data and pressure fluctuation data for Example 1 and Comparative Example 1A. This data is reproduced in graphical form at FIGS. 9A (temperature fluctuation) and 9B (pressure fluctuation). Example 1 utilizing the tube 28 results is much less fluctuation of temperature and pressure of the argon as the inert gas 54 compared to Comparative Example 1A, which does not utilize the tube 28. The reduced fluctuation of temperature and pressure resulting from use of the tube 28 leads to reduced variability of the diameter of the optical fiber 48.

Example 2 and Comparative Example 2A

In Example 2, actual optical fiber 48 was drawn from an optical fiber preform 46 with the optical fiber forming apparatus 10 that utilizes the tube 28 within the passageway 22. The second heating element 60 was set at 800° C. The inner diameter of the tube 28 was ¾ inch (1.905 cm). Optical fiber 48 was drawn at a rate of 20 m/s. The inert gas 54 was essentially pure argon (~100% argon by volume). In Comparative Example 2A, the tube 28 was not utilized, but otherwise all the conditions were the same as Example 2.

Figure 10A:
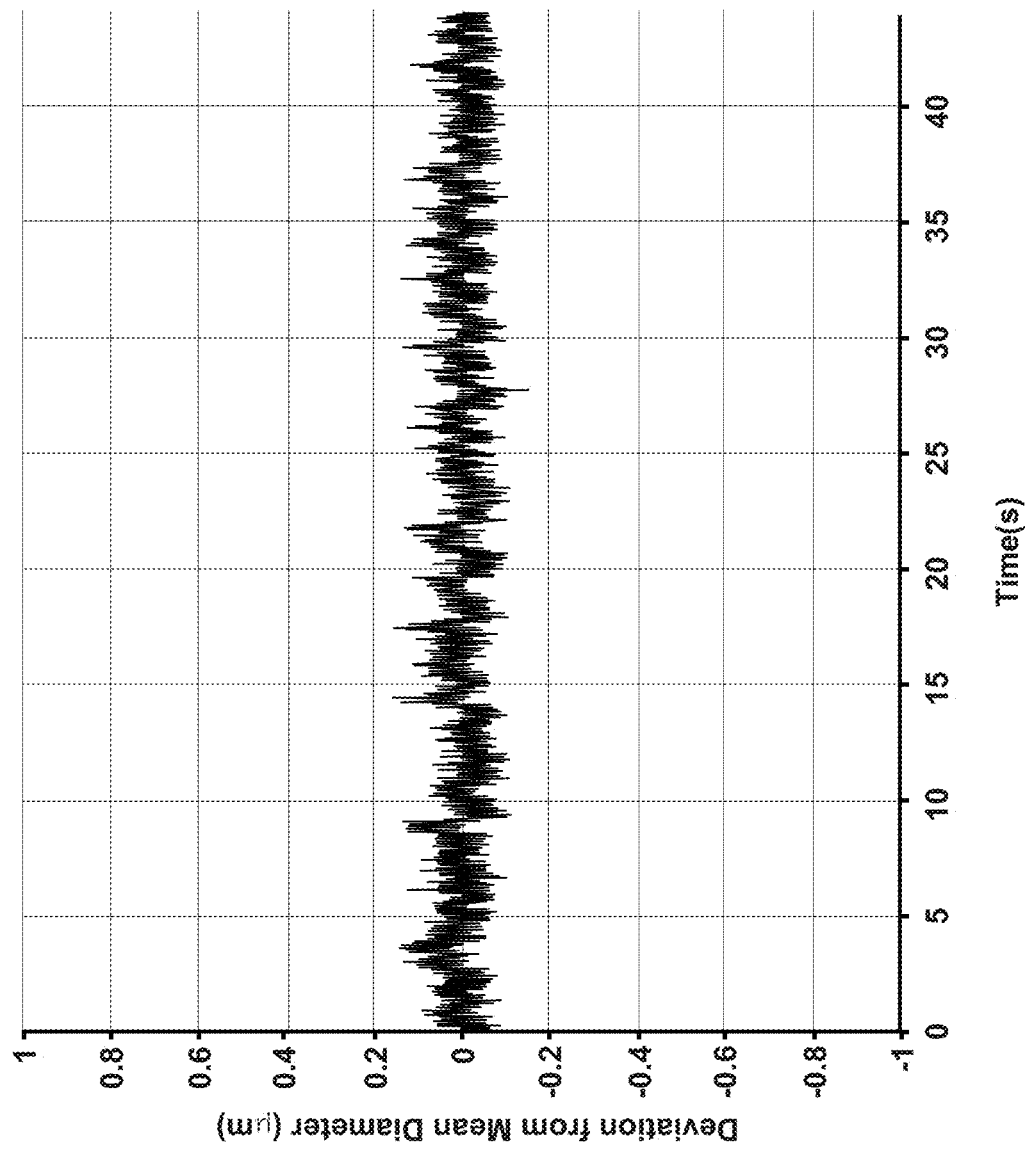
FIG. 10A, relating to an Example 2, is a graph of deviation from mean diameter as a function of time for optical fiber formed with the optical fiber forming apparatus of FIG. 1 with the tube.

The deviation of the diameter of the optical fiber 48 from the mean diameter as a function of time was measured for both Example 2 and the Comparative Example 2A. The results are graphically illustrated at FIGS. 10A (Example 2) and 10B (Comparative Example 2A). The mean diameter in both instances was 125 μm. For Example 2, which utilized the tube 28, the deviation of the diameter of the optical fiber 48 from the mean diameter of the optical fiber 48 throughout the time period for which diameter was measured varied by less than 0.2 μm in either direction from the mean diameter. In contrast, for Comparative Example 2A, which did not utilize the tube 28, the deviation of the diameter of the optical fiber 48 from the mean diameter of the optical fiber 48 varied often by more than 0.2 μm and sometimes by more than 0.6 μm. Thus, Example 2 utilizing the tube 28 resulted in optical fiber 48 with a more consistent diameter (i.e., less variability in diameter) than Example 2A not utilizing the tube 28.

Figure 11:
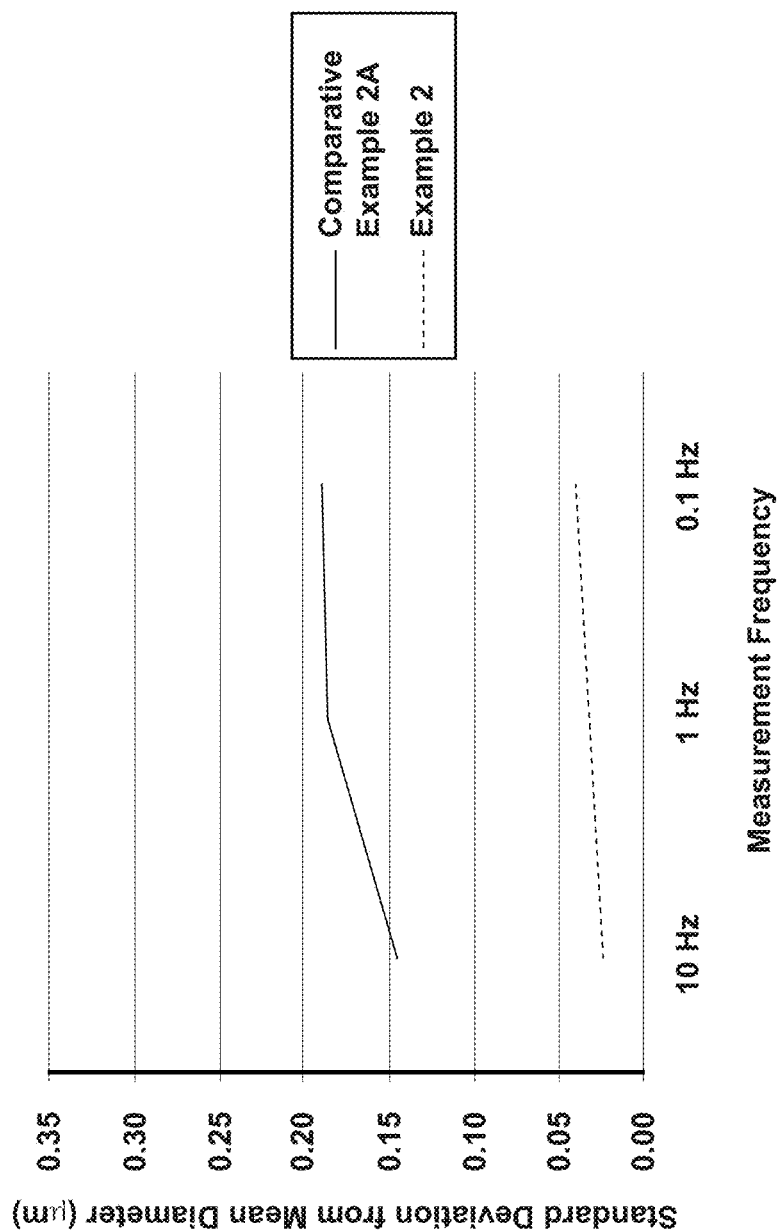
FIG. 11 is a graph of standard deviation from mean diameter as a function of measurement frequency for Example 2 and Comparative Example 2A, illustrating that the standard deviation for Example 2 (the optical fiber forming apparatus of FIG. 1 with the tube) is less than 0.05 µm across all measurement frequencies (10 Hz, 1 Hz, and 0.1 Hz), while the standard deviation for Comparative Example 2A (the optical fiber forming apparatus of FIG. 1 without the tube) was about 0.15 µm or greater across those measurement frequencies.

The standard deviation from the mean diameter for Example 2 and Comparative Example 2A was calculated and graphically illustrated at FIG. 11, as a function of frequency of measurement. At the draw rate of 20 m/s, the standard deviation from the mean diameter for the optical fiber 48 of Example 2 was less than 0.06 μm at frequencies of 0.1 Hz, 1 Hz, and 10 Hz. In contrast, the standard deviation from the mean diameter for the optical fiber 48 of Example 2A was about 0.15 μm or greater at the same range of frequencies.

Example 3

Figure 12:
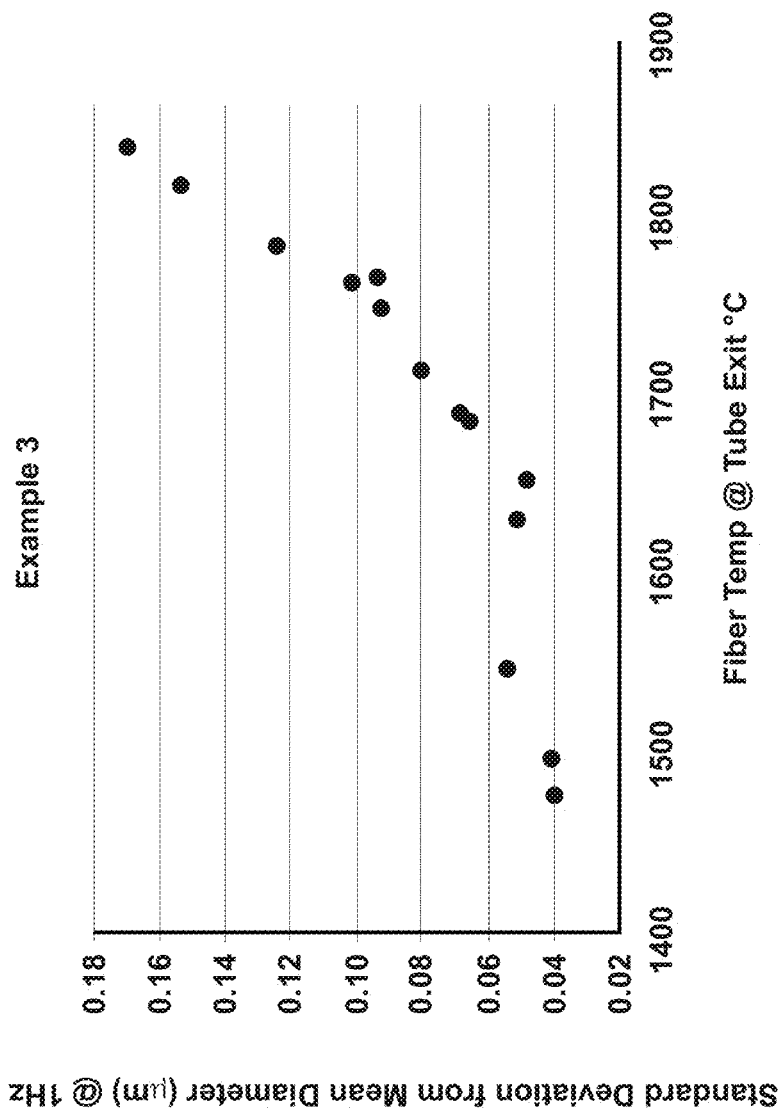
FIG. 12, relating to an Example 3, is a graph of standard deviation from mean diameter for optical fiber formed with the optical fiber forming apparatus of FIG. 1 with the tube as a function of the temperature of the optical fiber exiting the tube, illustrating that standard deviation increases as exit temperature increases.

For Example 3, optical fiber 48 was drawn from an optical fiber preform 46 with the optical fiber forming apparatus 10 that utilized the tube 28 within the passageway 22 at a variety of draw rates. The inert gas 54 was approximately 100% nitrogen. The second heating element 60 as well as the first heating element 42 were activated. The deviation of the diameter of the optical fiber 48 from the mean diameter was measured at a frequency of 1 Hz. The standard deviation from the mean diameter was then calculated. In addition, the temperature of the optical fiber 48 at the outlet 38 of the tube 28 was measured. The results are graphically illustrated at FIG. 12. Note that as the temperature of the optical fiber 48 at the outlet 38 of the tube 28 increased, the standard deviation from the mean diameter of the optical fiber 48 increased. Nevertheless, the standard deviation from the mean diameter of the optical fiber 48 was typically 0.06 μm or less, when the temperature of the optical fiber 48 at the outlet 38 was 1650° C. or less. Everything else being equal, decreasing the draw rate or lengthening the tube 28 results decreases temperature of the optical fiber 48 at the outlet 38 thus decreasing standard deviation from the mean diameter of the optical fiber 48.

Example 4 and Comparative Example 4A

Figure 13:
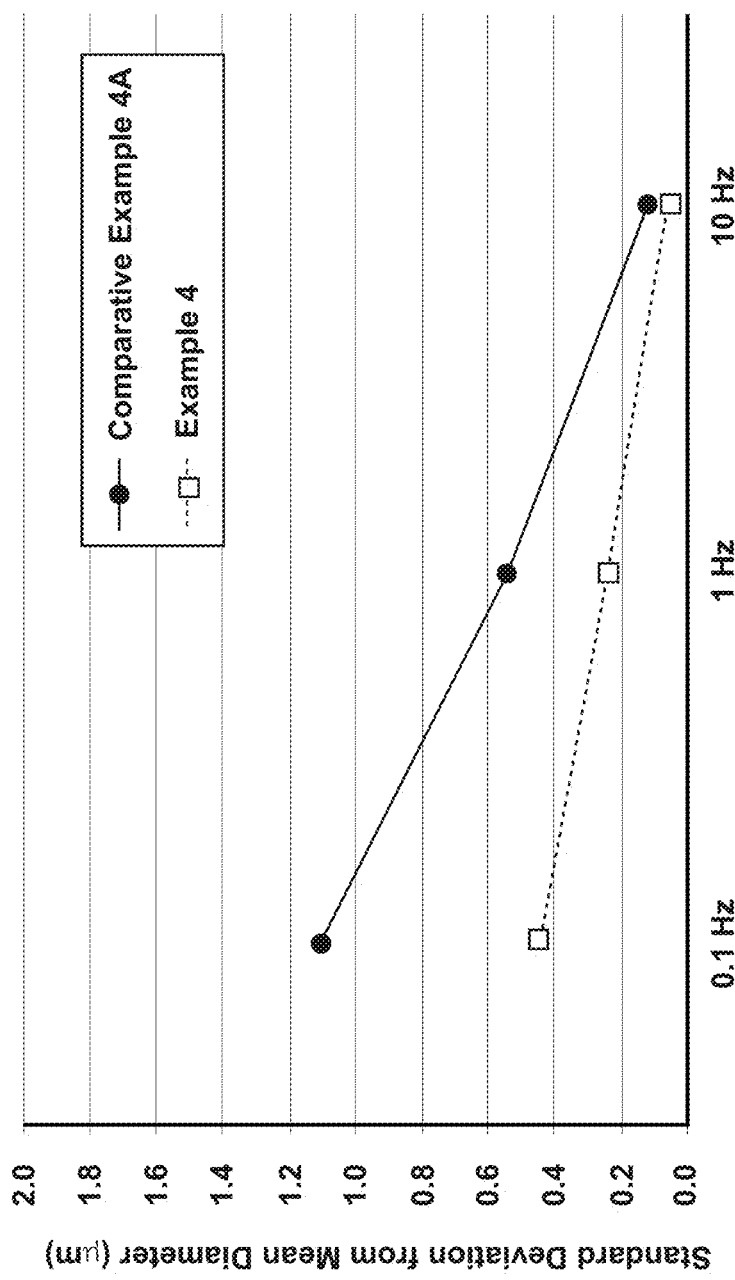
FIG. 13 is a graph of standard deviation from mean diameter for optical fiber formed with the optical fiber forming apparatus of FIG. 1 with the tube (Example 4) and without the tube (Comparative Example 4A), and both without activating a second heating element to heat a second range within the passageway generally above the optical fiber preform, illustrating the use of the tube resulting in a lower standard deviation.

For Example 4, the optical fiber forming apparatus 10 with the tube 28 was utilized to draw optical fiber 48 from an optical fiber preform 46. Essentially pure argon was utilized as the inert gas 24. The first heating element 42 was activated but not the second heating element 60. For Comparative Example 4A, the same setup was utilized but without the tube 28. In both cases, optical fiber 48 was drawn at a rate of 20 m/s. The deviation from the mean diameter of the optical fiber 48 was measured at frequencies of 0.1 Hz, 1 Hz, and 10 Hz. The standard deviation from the mean diameter was calculated and graphically illustrated at FIG. 13. Across all frequencies of measurement, Example 4 utilizing the tube 28 resulted in a smaller standard deviation from the mean diameter for the drawn optical fiber 28 than Comparative Example 4A that did not utilize the tube 28. Further, comparing the data relating to Example 4 at FIG. 13 with the data relating to Example 2 at FIG. 11 reveals that activating the second heating element 60 while utilizing the tube 28 results in a smaller standard deviation from the mean diameter of the optical fiber 48 compared to not activating the second heating element 60 while utilizing the tube 28.

Example 5

For Example 5, a computation fluid dynamics simulation was again utilized to produce a stream function contour plot for argon as the inert gas 54 flowing through the optical fiber forming apparatus 10A with the passageway 22 defined by the tapered portion 80 and then the second straight portion 82 of the inner surface 20A of the muffle 16A. The second straight portion 82 was assumed to have a diameter (twice the radius 92) of ¾ inch (1.905 cm). Both the first heating element 42 and the second heating element 60 were assumed to be activated to raise the temperature within the first range 44 and the second range 62 of the passageway 22.

Figure 14A:
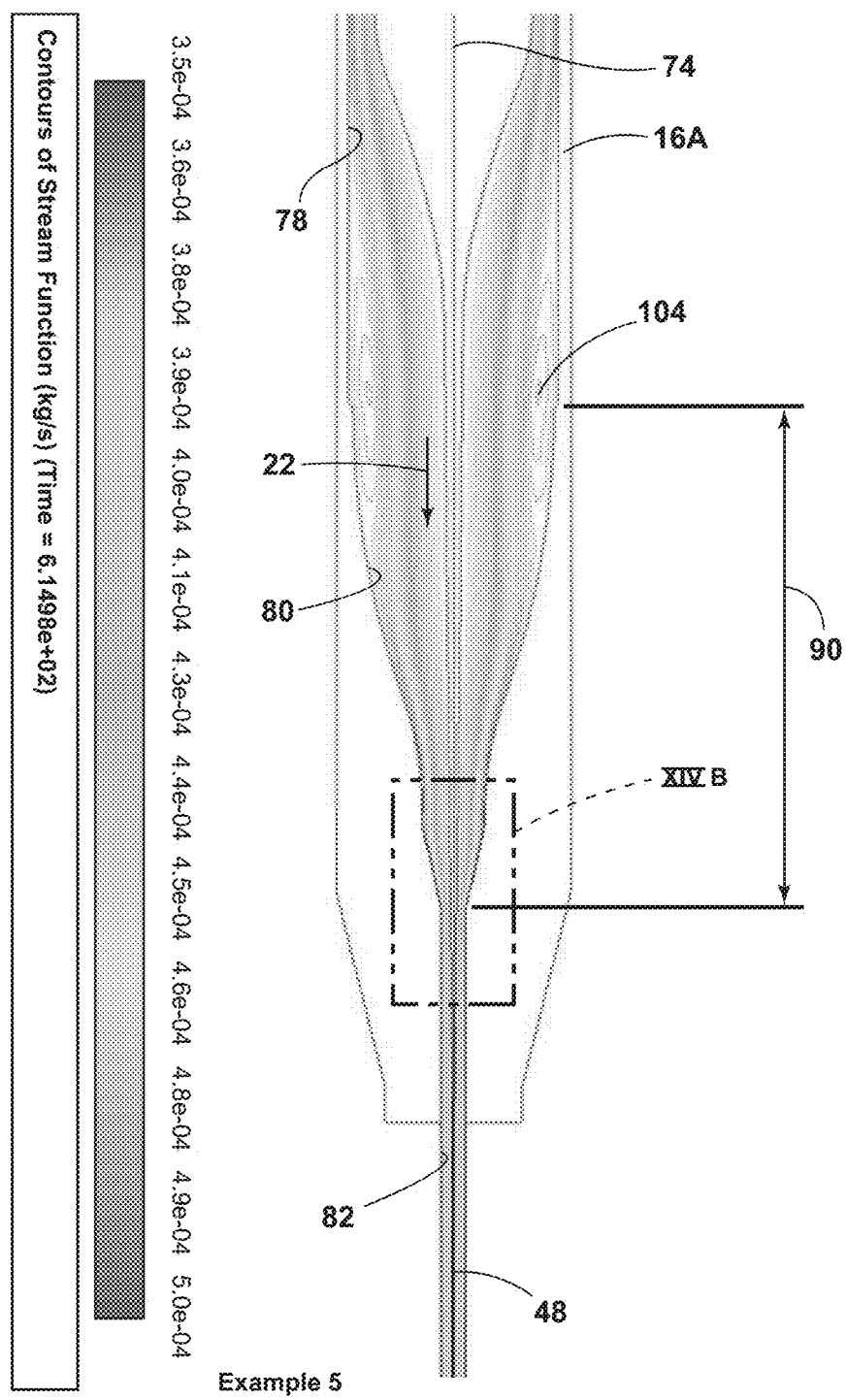
FIG. 14A, relating to an Example 5, is a stream function contour plot for the optical fiber forming apparatus of FIG. 3 with the passageway defined by the tapered portion and the relatively small diameter second straight portion, illustrating the lack of convection cells of argon as the inert gas near the optical fiber drawn from the optical fiber preform.
Figure 14B:
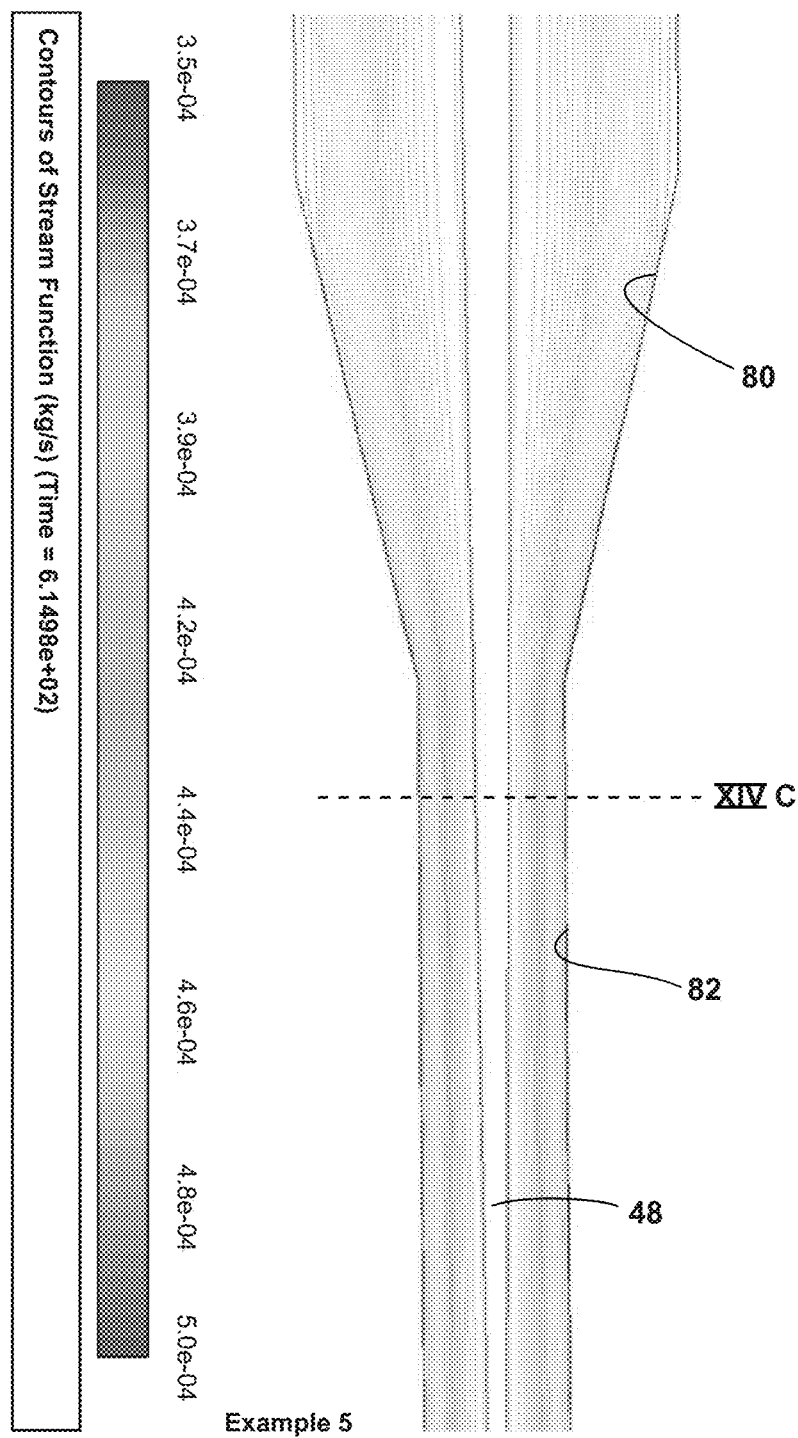
FIG. 14B is area XIVB of FIG. 14A.
Figure 14C:
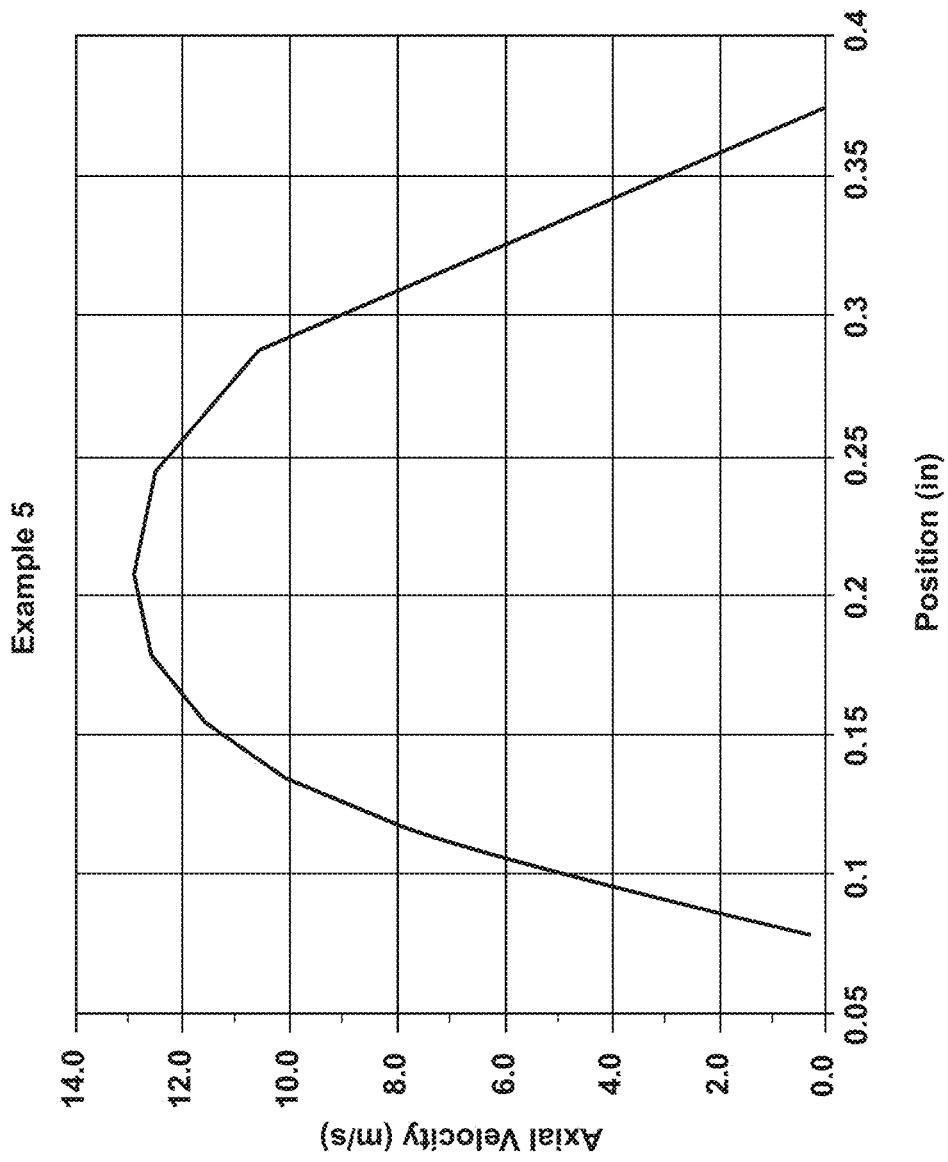
FIG. 14C is a graph of axial velocity of the argon as inert gas as a function of position within the passageway taken at line XIVC of FIG. 14B, illustrating all positive values and thus unidirectional downward flow void of convection cells that would disturb the optical fiber.

This stream function contour plot is reproduced at FIGS. 14A and 14B. As illustrated, there are no convention cells 104 at the transition of the tapered portion 80 to the second straight portion 82. Rather, the argon flows in a consistent downward manner. An axial velocity profile of the argon flow at line XIVC of FIG. 14B is reproduced at FIG. 14C. The axial velocity profile illustrates positive values and thus unidirectional downward flow. The values of the axial velocity for Example 5 are larger than that for Example 1, which utilizes the tube 28 (see FIG. 6C), because all of the inert gas 54 flows through the passageway 22 in Example 5, while in Example 1 the flow of the inert gas 54 flow is split into the inner stream 56 within the tube 28 and the outer stream 58 outside of the tube 28. The optical fiber 48 produced from the optical fiber forming apparatus 10A should have improved diameter variability compared to the optical fiber 48 produced from the optical fiber forming apparatus of Comparative Example 1A (FIGS. 7A-7B) where convention cells 104 are generated above the narrowing 26 of the passageway 22.

Figure 15A:
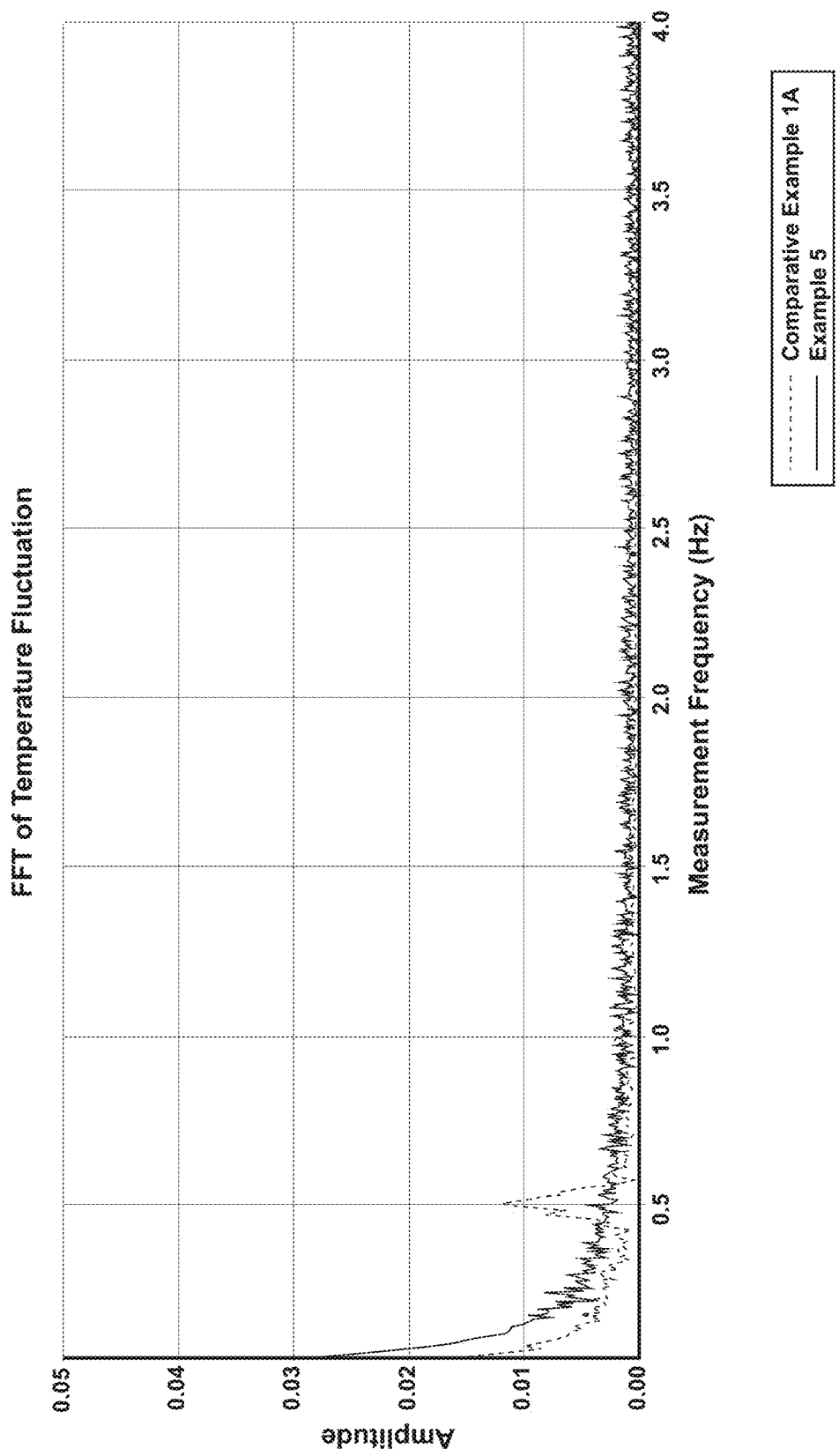
FIG. 15A is a graph of temperature fluctuation for both Example 5 and Comparative Example 1A, illustrating the optical fiber forming apparatus of Example 5 utilizing the passageway defined by the tapered portion and the relatively small diameter second straight portion having less temperature fluctuations, especially at lower measurement frequency, than the optical fiber forming apparatus of Comparative Example 1A not utilizing a relatively small diameter second straight portion.
Figure 15B:
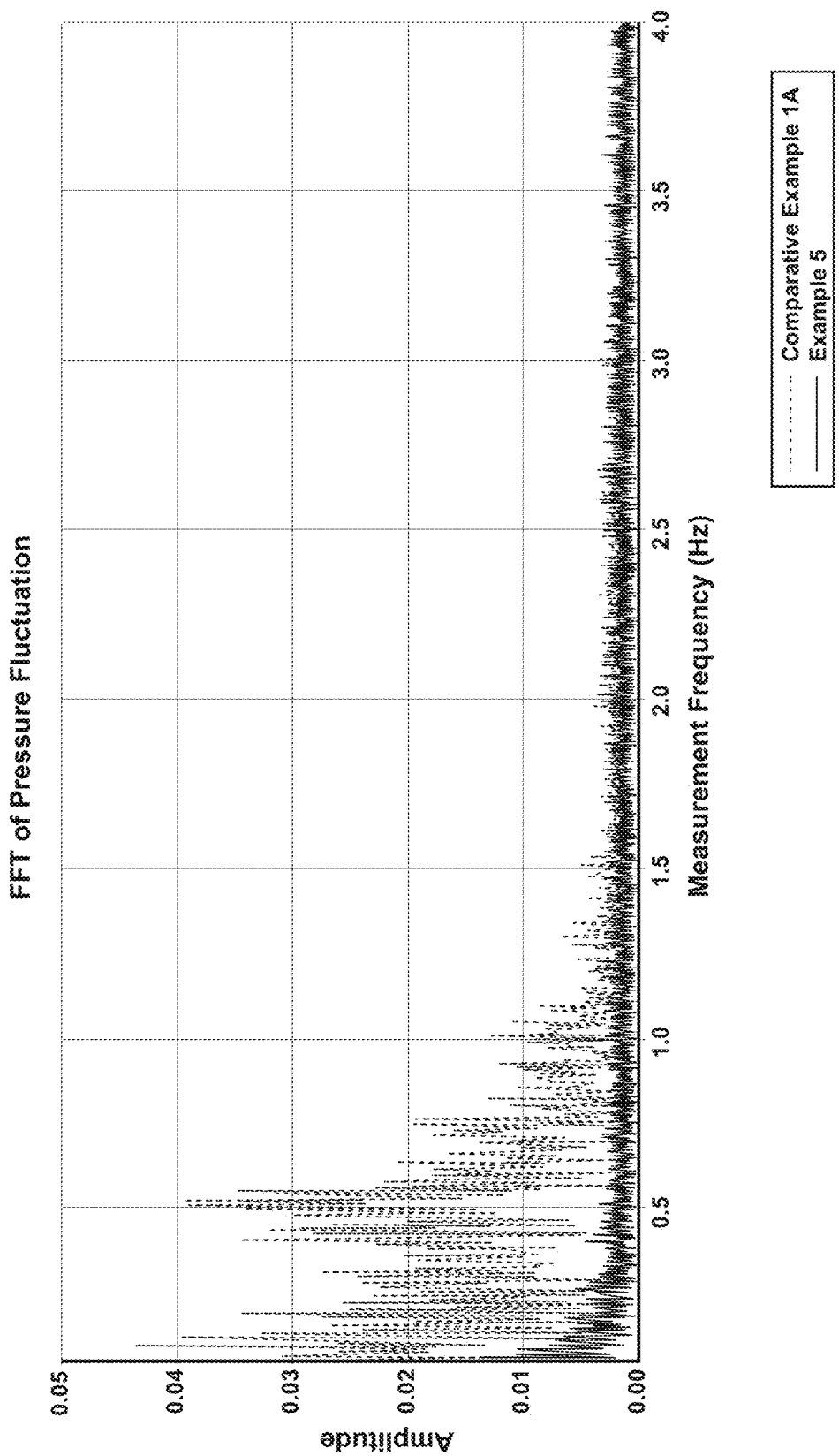
FIG. 15B is a graph of pressure fluctuation for both Example 5 and Comparative Example 1A, illustrating the optical fiber forming apparatus of Example 5 utilizing the passageway defined by the tapered portion and the relatively small diameter second straight portion having less pressure fluctuations, especially at lower measurement frequency, than the optical fiber forming apparatus of Comparative Example 1A not utilizing a relatively small diameter second straight portion.

The computational fluid dynamics model additionally produced temperature fluctuation data and pressure fluctuation data for Example 5 versus Comparative Example 1A. This data is reproduced in graphical form at FIGS. 15A (temperature fluctuation) and 15B (pressure fluctuation). Example 5 utilizing the passageway 22 defined by the tapered portion 80 and the second straight portion 82 of the inner surface 20A of the muffle 16A results is much less fluctuation of temperature and pressure of the argon compared to Comparative Example 1A. The reduced fluctuation of temperature and pressure should reduce the variability of the diameter of the optical fiber 48.

Without being bound by theory, it is again believed that the relatively small diameter of the inner surface 20A defined by the second straight portion 82 for this embodiment of the optical fiber forming apparatus 10A reduces the distance (i.e., the characteristic length $L_c$) between the optical fiber 48 and the inside surface 20A sufficiently to minimize convection of the inert gas 54. Thus, the relatively small diameter of the inner surface 20A defined by the second straight portion 82 allows for an inert gas 54 other than helium, such as argon or nitrogen, to be utilized without significantly negatively affecting the diameter variability of the optical fiber 48.

Example 6

In Example 6, actual optical fiber 48 was drawn from an optical fiber preform 46 with the optical fiber forming apparatus 10A that utilizes the relatively small diameter inner surface 20A defined by the straight second portion 82. The diameter of the inner surface 20A of the second straight portion 82 was ¾ inch (1.905 cm). Optical fiber 48 was drawn at a rate of 20 m/s. The inert gas 54 was essentially pure argon (~100% argon by volume). The second heating element 60 was activated.

Figure 10B:
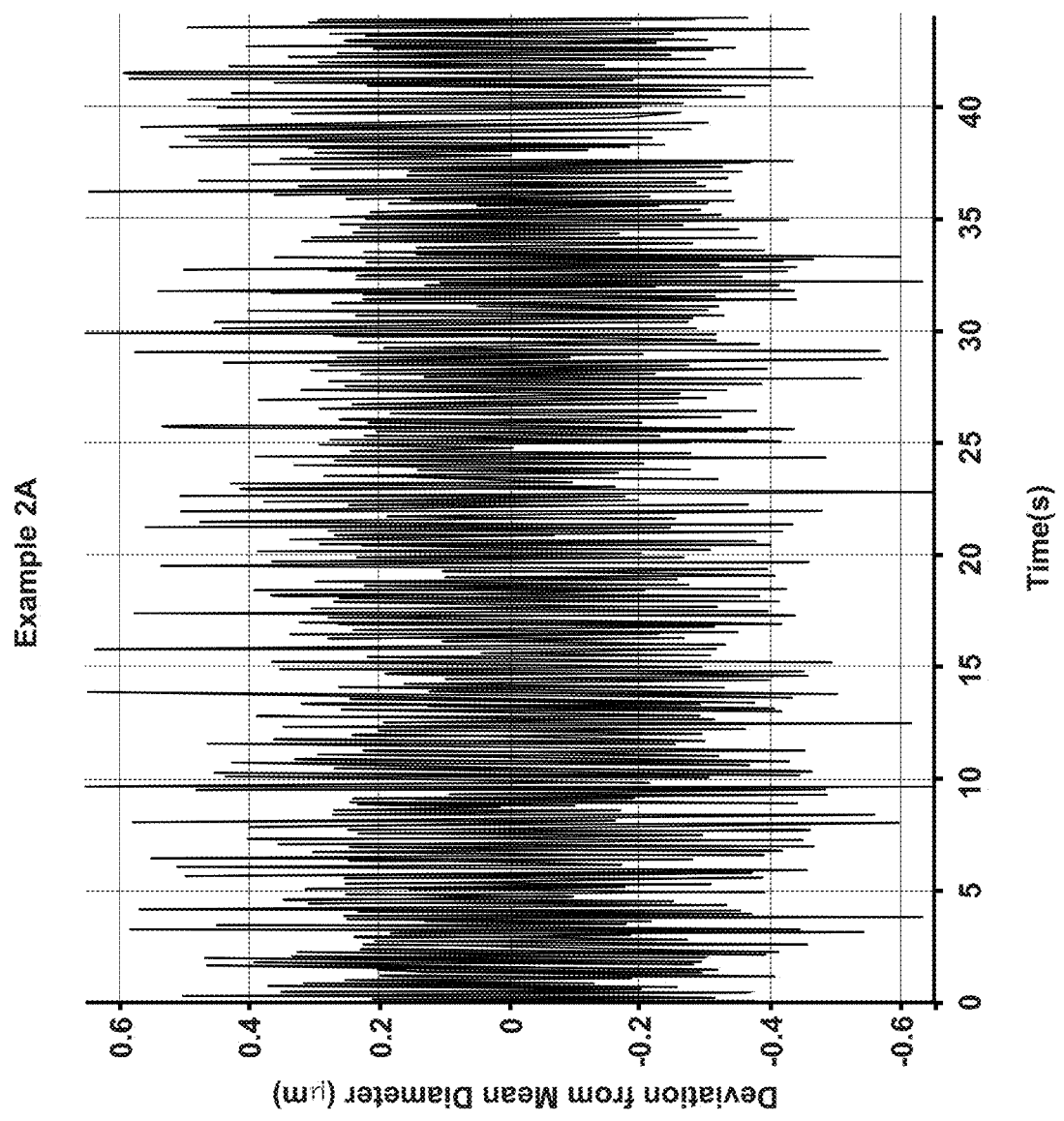
FIG. 10B, relating to Comparative Example 2A, is a graph of deviation from mean diameter as a function of time for optical fiber formed with the optical fiber forming apparatus of FIG. 1 but without the tube.
Figure 16:
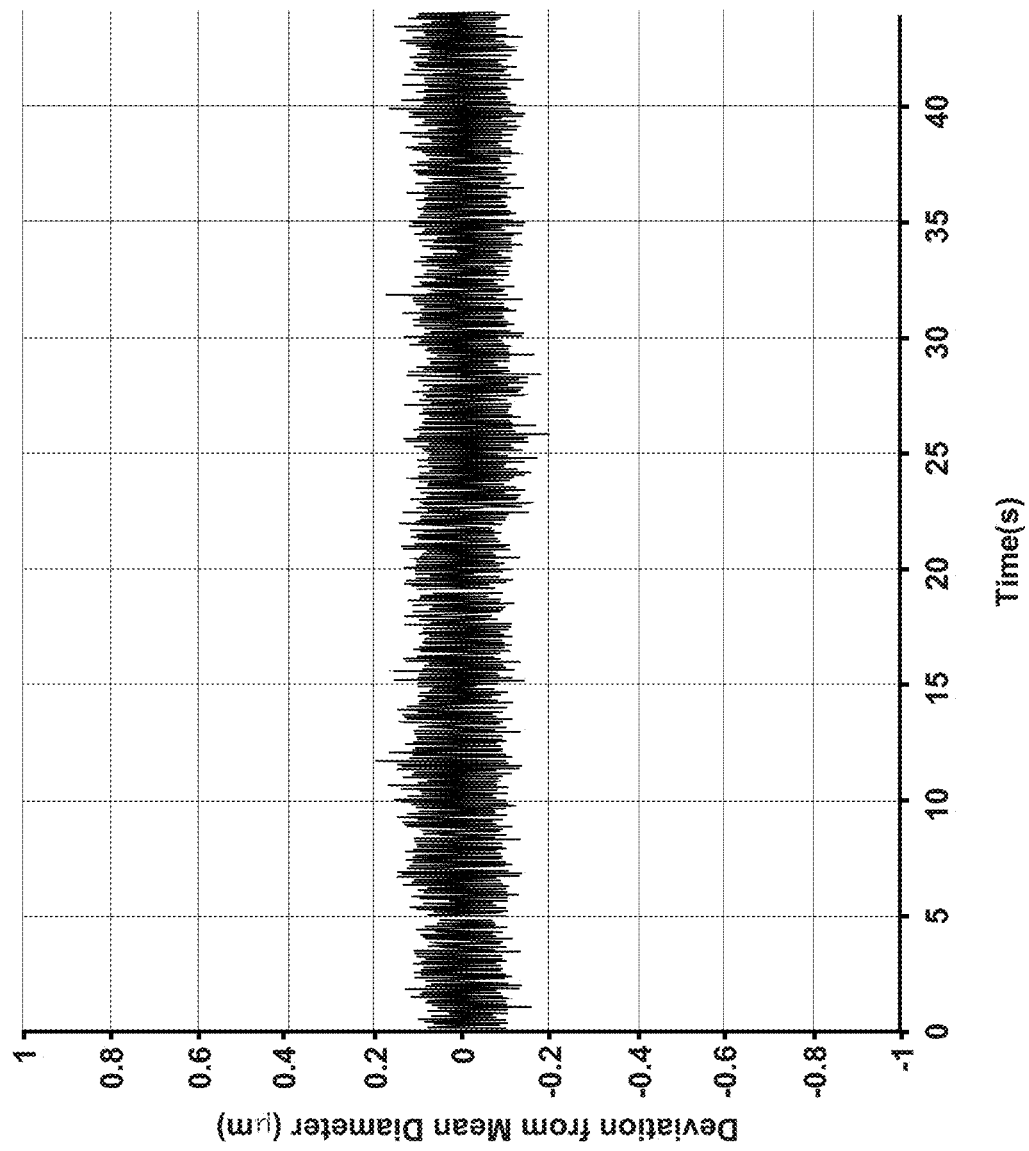
FIG. 16 relating to an Example 5, is a graph of deviation from mean diameter as a function of time for optical fiber formed with the optical fiber forming apparatus of FIG. 3 with the passageway defined by the tapered portion and the relatively small diameter second straight portion.

The deviation of the diameter of the optical fiber 48 from the mean diameter as a function of time was measured for Example 6. The results are graphically illustrated at FIG. 16. The deviation of the diameter of the optical fiber 48 from the mean diameter of the optical fiber throughout the time period for which diameter was measured varied by less than 0.2 μm in either direction from the mean diameter. This can be compared with the Comparative Example 2A at FIG. 10B, which did not utilize a relatively small diameter inner surface 20A defined by the straight second portion 82. In the Comparative Example 2A, the deviation of the diameter of the optical fiber 48 from the mean diameter of the optical fiber 48 varied often by more than 0.2 μm and sometimes by more than 0.6 μm. Thus, Example 6 using the relatively small diameter inner surface 20A defined by the straight second portion 82 resulted in optical fiber 48 with a more consistent diameter (i.e., less variability in diameter) compared to the optical fiber 48 of Comparative Example 2A.

Figure 17:
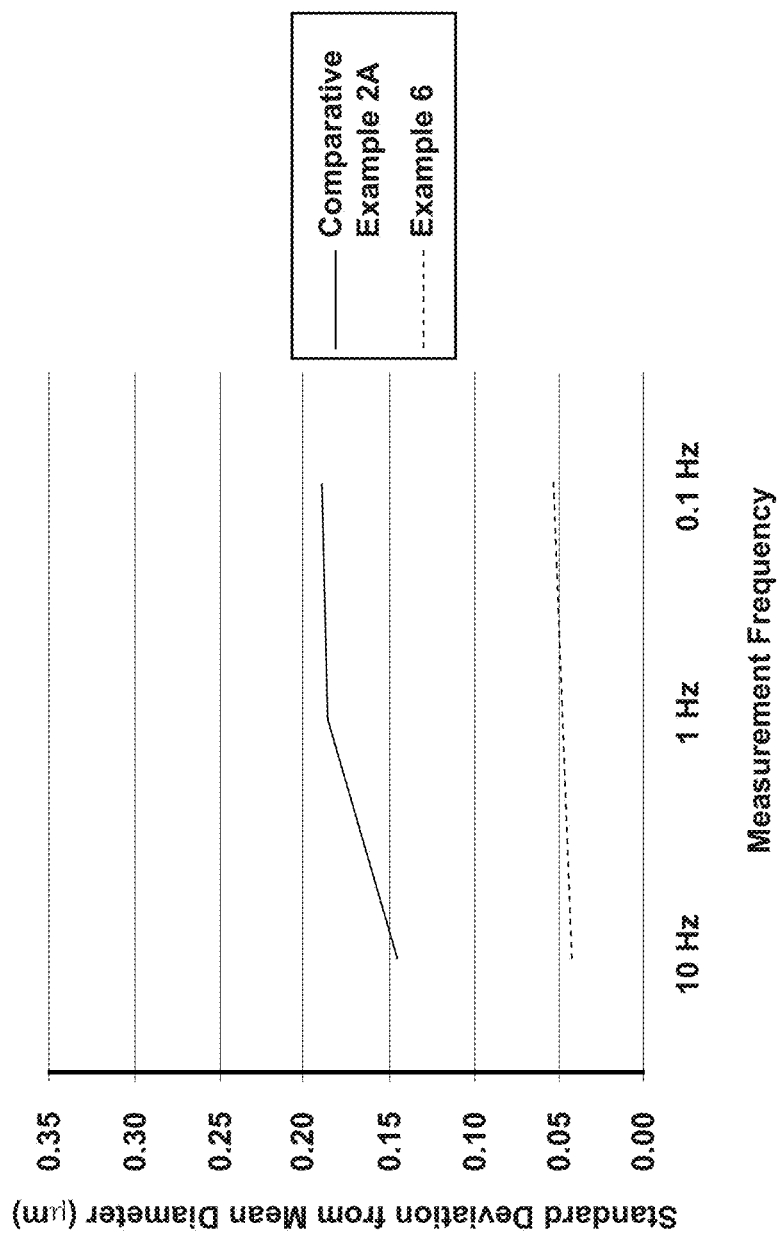
FIG. 17 is a graph of standard deviation from mean diameter as a function of measurement frequency for an Example 6 and Comparative Example 2A, illustrating that the standard deviation for Example 6 (the optical fiber forming apparatus of FIG. 3) is less than 0.06 µm across all measurement frequencies (10 Hz, 1 Hz, and 0.1 Hz), while the standard deviation for Comparative Example 2A (the optical fiber forming apparatus of FIG. 1 without the tube) was about 0.15 µm or greater across those measurement frequencies.

The standard deviation from the mean diameter of the optical fiber 48 for Example 6 was calculated. The results are graphically illustrated at FIG. 17 as a function of measurement frequency. The results for Example 6 are compared with Comparative Example 2A. As the graph illustrates, the standard deviation from the mean diameter of the optical fiber 48 of Example 6 was less than 0.06 μm for all of the measurement frequencies (10 Hz, 1 Hz and 0.1 Hz). In contrast, the standard deviation from the mean diameter of the optical fiber 48 for Comparative Example 2A was about 0.15 μm or higher for those measurement frequencies.

Example 7

In Example 7, optical fiber 48 was drawn using the optical fiber forming apparatus 10B with the third heating element 66 heating the passageway 22 throughout the third range 68 that encompasses a portion of the passageway 22 defined by the second straight portion 98 of the inner surface 20 of the muffle 16. The third heating element 66 was set to a temperature of 150° C. The optical fiber 48 was drawn at a rate of 20 m/s. The inert gas 54 was 100% argon. The first heating element 42 and the second heating element 60 were additionally activated.

Figure 18:
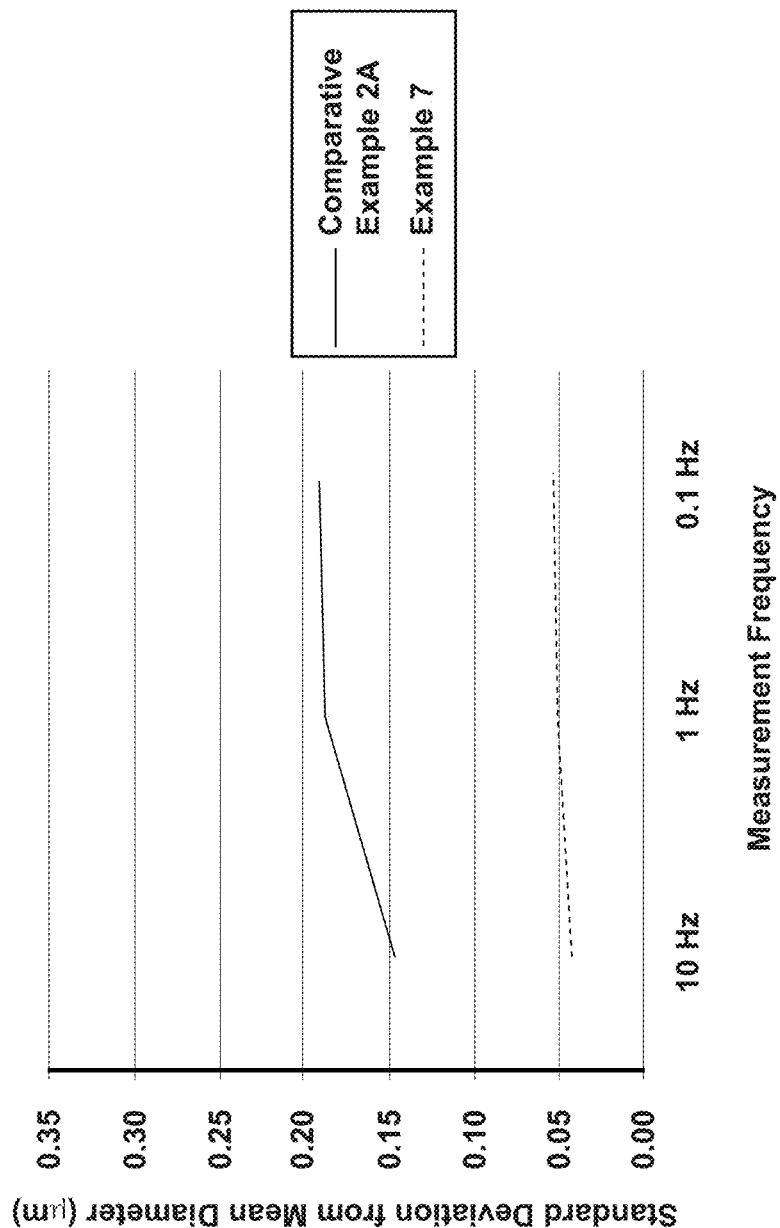
FIG. 18 is a graph of standard deviation from mean diameter as a function of measurement frequency for an Example 7 and Comparative Example 2A, illustrating that the standard deviation for Example 7 (the optical fiber forming apparatus of FIG. 5, with the heating element heating the second straight portion) is less than 0.06 µm across all measurement frequencies (10 Hz, 1 Hz, and 0.1 Hz), while the standard deviation for Comparative Example 2A (the optical fiber forming apparatus of FIG. 1 without the tube and no heating element heating the lower parts of the passageway past the narrowing) was about 0.15 µm or greater across those measurement frequencies.

The deviation of the diameter from the mean diameter of the optical fiber 48 was measured at various time frequencies (10 Hz, 1 Hz, and 0.1 Hz). The standard deviation from the mean diameter was calculated. The results are presented at FIG. 18. The results for Example 7 are compared on the graph to the results for Comparative Example 2A. With Comparative Example 2A, no third heating element 66 was utilized but the setup was otherwise the same as Example 7. As the graph of FIG. 18 illustrates, the use of the third heating element 66 results in a much lower standard deviation from the mean diameter than without use of the third heating element 66. For Example 7, the standard deviation from the mean diameter was less than 0.06 μm across all measurement time frequencies. For Comparative Example 2A, the standard deviation from the mean diameter was about 0.15 μm or above for the same measurement time frequencies. Without being bound by theory, it is believed that the use of the third heating element 66 increases the kinematic viscosity of the inert gas 54 in suppressing convective instabilities within the portion of the passageway 22 defined by the second straight portion 98 of the inner surface 20 of the muffle 16. Referring back to the equation for the Grashof number (Gr) above, the higher the kinematic viscosity (v) of the gas, the lower the Grashof number (Gr).

What is claimed is:

1. An optical fiber forming apparatus comprising:
   a draw furnace comprising: (i) a muffle with an inner surface, (ii) an axial opening below the muffle, the inner surface of the muffle defining a passageway extending through the axial opening, and (iii) an upper inlet into the passageway; and
   a tube that extends into the passageway of the draw furnace above the axial opening, the tube having (i) an outer surface and the inner surface of the muffle surrounds the outer surface of the tube with a space separating the outer surface of the tube from the inner surface of the muffle, (ii) an inner surface that defines a second passageway extending through the tube, (iii) an inlet into the second passageway of the tube, (iv) an outlet out of the second passageway of the tube,
   wherein, the muffle further comprises a narrowing where the passageway narrows towards the axial opening,
   wherein, the tube extends upward above the narrowing, and
   wherein, the axial opening of the draw furnace and the tube are positioned to be coaxial around an optical fiber being drawn from an optical fiber preform disposed within the passageway of the draw furnace.

2. The optical fiber forming apparatus of claim 1, wherein inert gas flows through the upper inlet and into the passageway of the draw furnace and forms separate streams, one of which flows through the passageway of the draw furnace in the space between the inner surface of the muffle and the outer surface of the tube and out the axial opening of the draw furnace, and the other of which flows into the inlet of the tube, through the second passageway of the tube, and out the outlet of the tube.

3. The optical fiber forming apparatus of claim 2, wherein the inert gas comprises one or more of argon or nitrogen, and less than 1 percent by volume helium.

4. The optical fiber forming apparatus of claim 1 further comprising:
   a first heating element that heats the passageway of the draw furnace throughout a first range that encompasses at least a portion of the passageway of the draw furnace above the inlet of the tube; and
   a second heating element that heats the passageway of the draw furnace throughout a second range that encompasses at least a portion of the passageway of the draw furnace above the first range.

5. The optical fiber forming apparatus of claim 1 further comprising:
   a first heating element that is positioned to heat the passageway of the draw furnace throughout a first range that encompasses a tip of an optical fiber preform disposed within the passageway of the draw furnace.

6. The optical fiber forming apparatus of claim 5 further comprising:
   a second heating element that is positioned to heat the passageway of the draw furnace throughout a second range that encompasses a portion of the passageway above a main body of the optical fiber preform.

7. The optical fiber forming apparatus of claim 6 further comprising:
   a third heating element that heats the passageway of the draw furnace throughout a third range that encompasses a portion of the second passageway of the tube.

8. The optical fiber forming apparatus of claim 1, wherein the tube extends through the axial opening of the draw furnace.

9. The optical fiber forming apparatus of claim 1, wherein the inlet of the tube has an inner diameter of 1.27 cm to 2.54 cm.

10. A method of operating an optical fiber forming apparatus comprising:
    drawing optical fiber from an optical fiber preform with the optical fiber forming apparatus of claim 1, wherein the optical fiber preform is disposed within the passageway of the draw furnace.

11. The method of claim 10, wherein
    the optical fiber forming apparatus further comprises a first heating element that heats the passageway of the draw furnace throughout a first range that encompasses a tip of the optical fiber preform.

12. The method of claim 11, wherein
    the optical fiber forming apparatus further comprises a second heating element that heats the passageway throughout a second range that encompasses (i) a portion of the passageway above a main body of the optical fiber preform and (ii) a boule that supports the optical fiber preform.

13. The method of claim 12, wherein
    the optical fiber forming apparatus further comprises a third heating element that heats the passageway of the draw furnace throughout a third range that encompasses a portion of the second passageway of the tube.

14. The method of claim 10, wherein
the optical fiber exits the outlet of the tube at a rate of at least 20 meters per second and has a diameter after exiting the outlet of the tube, the standard deviation ($\sigma$) of which diameter is less than 0.06 µm at frequencies of 0.1 Hz, 1 Hz, and 10 Hz.

15. A draw furnace for an optical fiber forming apparatus comprising:
a muffle with an inner surface and an axial opening below the muffle, the inner surface of the muffle defining a passageway centered about an axis and extending through the axial opening, the inner surface including:
a first straight portion with a radius from the axis that remains at least approximately constant along a length parallel to the axis;
a tapered portion disposed between the first straight portion and the axial opening, the tapered portion including a radius from the axis that decreases away from the first straight portion narrowing the passageway, and a vertical length parallel to the axis that is at least two times longer than the largest radius of the tapered portion; and
a second straight portion disposed between the tapered portion and the axial opening with a radius from the axis that remains at least approximately constant along a length at least 75 cm, the radius of the second straight portion being 0.635 cm to 1.27 cm.

16. The draw furnace of claim 15 further comprising:
an upper inlet into the passageway disposed closer to the first straight portion than the tapered portion of the inner surface of the muffle;
wherein, inert gas flows (i) through the upper inlet and into the passageway, (ii) then along the first straight portion of the inner surface of the muffle, (iii) then along the tapered portion, (iv) then along the second straight portion, and (v) then out the axial opening.

17. The draw furnace of claim 16, wherein
the inert gas comprises one or more of argon and nitrogen, and less than 1 percent by volume helium.

18. The draw furnace of claim 15 further comprising:
a first heating element that is positioned to heat the passageway throughout a first range that encompasses a tip of an optical fiber preform; and
a second heating element that is positioned to heat the passageway throughout a second range that encompasses a portion of the passageway above a main body of the optical fiber preform.

19. The draw furnace of claim 18 further comprising:
a third heating element that heats a third range that encompasses a portion of the passageway that the second straight portion that the inner surface of the muffle defines.

20. A draw furnace for an optical fiber forming apparatus comprising:
a muffle with an inner surface and an axial opening below the muffle, the inner surface of the muffle defining a passageway centered about an axis and extending through the axial opening, the inner surface including:
a first straight portion with a radius from the axis that remains at least approximately constant along a length parallel to the axis;
a narrowing portion disposed between the first straight portion and the axial opening, the narrowing portion including a radius from the axis that decreases away from the first straight portion narrowing the passageway; and
a second straight portion disposed between the narrowing portion and the axial opening with a radius from the axis that remains at least approximately constant along a length parallel to the axis;
a first heating element that heats the passageway throughout a first range that encompasses a portion of the passageway defined by the first straight portion;
a second heating element that heats the passageway throughout a second range that encompasses a portion of the passageway defined by the first straight portion above the first range; and
a third heating element that heats the passageway to a temperature of 100° C. to 200° C. throughout a third range that encompasses a portion of the passageway defined by the second straight portion.

21. The draw furnace of claim 20, wherein
the first range that the first heating element heats is positioned to encompass a tip of an optical fiber preform disposed within the passageway;
the second range that the second heating element heats is positioned to be at least partially above a main body of the optical fiber preform; and
the third range that the third heating element heats is positioned to encompass a portion of optical fiber drawn from the optical fiber preform.

22. The draw furnace of claim 20 further comprising:
an upper inlet into the passageway disposed closer to the first straight portion than the narrowing portion;
wherein, inert gas flows (i) through the upper inlet and into the passageway, (ii) then along the first straight portion of the inner surface of the muffle, (iii) then along the narrowing portion of the inner surface of the muffle, (iv) then along the second straight portion of the inner surface of the muffle, and (v) then out the axial opening; and
wherein, the inert gas comprises one or more of argon and nitrogen, and less than 1 percent by volume helium.

* * * * *